United States Patent
Grafi

(10) Patent No.: US 10,664,602 B2
(45) Date of Patent: *May 26, 2020

(54) DETERMINING MALWARE PREVENTION BASED ON RETROSPECTIVE CONTENT SCAN

(71) Applicant: VOTIRO CYBERSEC LTD., Tel-Aviv (IL)

(72) Inventor: Aviv Grafi, Ramat Gan (IL)

(73) Assignee: Votiro Cybersec Ltd., Tel-Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/926,862

(22) Filed: Mar. 20, 2018

(65) Prior Publication Data

US 2018/0276389 A1 Sep. 27, 2018

Related U.S. Application Data

(63) Continuation of application No. 15/672,037, filed on Aug. 8, 2017, now Pat. No. 9,922,191.

(Continued)

(51) Int. Cl.
*G06F 21/57* (2013.01)
*G06F 21/10* (2013.01)
(Continued)

(52) U.S. Cl.
CPC ............ *G06F 21/577* (2013.01); *G06F 21/10* (2013.01); *G06F 21/316* (2013.01); *G06F 21/53* (2013.01);
(Continued)

(58) Field of Classification Search
CPC ...... G06F 21/577; G06F 21/316; G06F 21/53; G06F 21/564; G06F 21/55; G06F 21/10;
(Continued)

(56) References Cited

U.S. PATENT DOCUMENTS 4,654,484 A 3/1987 Reiffel et al.
5,164,839 A 11/1992 Lang
(Continued)

FOREIGN PATENT DOCUMENTS

WO WO 2011014623 2/2011

OTHER PUBLICATIONS

Dong et al., "Protecting Sensitive Web Content from Client-side Vulnerabilities with CRYPTONs", Nov. 2013, ACM, pp. 1311-1324. (Year: 2013).*

(Continued)

*Primary Examiner* — Matthew Smithers
(74) *Attorney, Agent, or Firm* — Finnegan, Henderson, Farabow, Garrett & Dunner LLP

(57) ABSTRACT

The disclosed embodiments include a method for retroactively analyzing original input content to detect malicious content in a computer system, in which the original input content has been previously processed to generate modified input content and prevented from being received by an intended recipient. The method includes accessing the original input content or a characteristic associated with the original input content, and analyzing it based on a malware detection algorithm to determine whether the original input content includes suspected malicious content, wherein the malware detection algorithm includes at least one update of a signature or behavioral characteristic that was not included in the malware detection algorithm when the modified input content was generated. When it is determined that the original input content includes suspected malicious content, the method includes analyzing the modified input content to determine whether the modified input content includes the suspected malicious content.

40 Claims, 6 Drawing Sheets

Related U.S. Application Data

(60) Provisional application No. 62/442,452, filed on Jan. 5, 2017, provisional application No. 62/450,605, filed on Jan. 26, 2017, provisional application No. 62/473,902, filed on Mar. 20, 2017.

(51) Int. Cl.
| | |
|---|---|
| *G06F 21/55* | (2013.01) |
| *G06F 21/31* | (2013.01) |
| *G06F 21/53* | (2013.01) |
| *G06F 21/56* | (2013.01) |
| *H04L 9/00* | (2006.01) |
| *H04L 9/14* | (2006.01) |
| *H04L 9/30* | (2006.01) |
| *H04L 9/32* | (2006.01) |
| *H04L 29/06* | (2006.01) |

(52) U.S. Cl.
CPC ............ *G06F 21/55* (2013.01); *G06F 21/564* (2013.01); *H04L 9/006* (2013.01); *H04L 9/14* (2013.01); *H04L 9/30* (2013.01); *H04L 9/3226* (2013.01); *H04L 9/3247* (2013.01); *H04L 63/145* (2013.01); *H04L 63/1425* (2013.01); *H05K 999/99* (2013.01); *H04L 63/0236* (2013.01); *H04L 63/1416* (2013.01); *H04L 63/1466* (2013.01); *H04L 63/308* (2013.01)

(58) Field of Classification Search
CPC ..... H05K 999/99; H04L 9/30; H04L 63/1425; H04L 9/3247; H04L 9/3226; H04L 9/006; H04L 9/14; H04L 63/145; H04L 63/0236; H04L 63/1416; H04L 63/1466; H04L 63/308
See application file for complete search history.

(56) References Cited

U.S. PATENT DOCUMENTS

| | | | |
|---|---|---|---|
| 6,324,334 | B1 | 11/2001 | Morioka et al. |
| 7,185,017 | B1 | 2/2007 | Cauvin et al. |
| 7,263,561 | B1 | 8/2007 | Green et al. |
| 7,739,100 | B1 | 6/2010 | Muttik et al. |
| 7,797,743 | B2 | 9/2010 | Treacy et al. |
| 8,180,837 | B2 | 5/2012 | Lu et al. |
| 8,185,954 | B2 | 5/2012 | Scales |
| 8,316,459 | B2 | 11/2012 | Shani |
| 8,375,450 | B1 | 2/2013 | Oliver et al. |
| 8,533,824 | B2 | 9/2013 | Hutton et al. |
| 8,745,742 | B1 | 6/2014 | Satish et al. |
| 8,763,128 | B2 | 6/2014 | Lim et al. |
| 8,869,283 | B2 | 10/2014 | Scales |
| 9,038,174 | B2 | 5/2015 | Hutton et al. |
| 9,047,293 | B2 | 6/2015 | Grafi et al. |
| 9,300,686 | B2 | 3/2016 | Pidathala et al. |
| 9,330,264 | B1 | 5/2016 | Hutton |
| 9,516,045 | B2 | 12/2016 | Scales |
| 9,582,665 | B2 * | 2/2017 | Eytan ............... G06F 21/568 |
| 9,602,527 | B2 * | 3/2017 | Yu .................. H04L 63/1441 |
| 9,832,223 | B2 | 11/2017 | Eytan et al. |
| 9,922,191 | B1 * | 3/2018 | Grafi ............... G06F 21/577 |
| 9,946,877 | B2 | 4/2018 | Eytan et al. |
| 9,977,901 | B2 | 5/2018 | Eytan et al. |
| 2003/0229810 | A1 | 12/2003 | Bango |
| 2005/0257045 | A1 | 11/2005 | Bushman et al. |
| 2007/0056035 | A1 | 3/2007 | Copley |
| 2007/0087766 | A1 | 4/2007 | Hardy et al. |
| 2007/0113282 | A1 | 5/2007 | Ross |
| 2008/0209551 | A1 | 8/2008 | Treacy et al. |
| 2008/0301235 | A1 * | 12/2008 | Mankiewicz ......... G06Q 10/107 709/206 |
| 2009/0044024 | A1 * | 2/2009 | Oberheide ............ G06F 21/562 713/188 |
| 2009/0089879 | A1 | 4/2009 | Wang et al. |
| 2009/0150419 | A1 | 6/2009 | Kim et al. |
| 2009/0282484 | A1 | 11/2009 | Wiseman et al. |
| 2010/0115620 | A1 | 5/2010 | Alme |
| 2011/0314546 | A1 | 12/2011 | Aziz et al. |
| 2012/0167206 | A1 | 6/2012 | Reetz-Lamour et al. |
| 2012/0331303 | A1 | 12/2012 | Andersson et al. |
| 2013/0081065 | A1 | 3/2013 | Sharan et al. |
| 2015/0058978 | A1 | 2/2015 | Xiao et al. |
| 2016/0191531 | A1 | 6/2016 | Perlmutter et al. |
| 2016/0226889 | A1 | 8/2016 | Hentunen |
| 2017/0199730 | A1 | 7/2017 | Hay et al. |
| 2017/0250997 | A1 | 8/2017 | Rostamabadi et al. |
| 2017/0255777 | A1 | 9/2017 | Ford |
| 2017/0286678 | A1 | 10/2017 | Huang et al. |
| 2017/0353475 | A1 | 12/2017 | Hutton |
| 2018/0253554 | A1 | 9/2018 | Eytan et al. |

OTHER PUBLICATIONS

Vegge et al., "Where Only Fools Dare to Tread: An Empirical Study on the Prevalence of Zero-day Malware", 2009, IEEE, pp. 66-71. (Year: 2009).*
YazamTech, captured on Aug. 22, 2010, https://web.archive.org/web/20100822155839/http://yazamtech.com:80/en, 3 pages.
Products, YazamTech, captured on Aug. 23, 2010, https://web.archive.org/web/20100823005723/http://yazamtech.com:80/en/products, 3 pages.
YazamTech, captured on Oct. 7, 2010, https://web.archive.org/web/20101007160034/http://yazamtech.com:80/en?phpMyAdmin=2pTp23a-YBGPpnaPAXvSkgjFO71, 2 pages.
ShuttleIT, YazamTech, captured on Dec. 29, 2010, https://web.archive.org/web/20101229174141/http://yazamtech.com:80/en/shuttleit, 3 pages.
About Us, YazamTech, captured on Dec. 31, 2010, https://web.archive.org/web/20101231084709/http://yazamtech.com:80/en/about-us, 2 pages.
Contact Us, YazamTech, captured on Dec. 31, 2010, https://web.archive.org/web/20101231084713/http://yazamtech.com:80/en/contact, 1 page.
Distributors, YazamTech, captured on Dec. 31, 2010, https://web.archive.org/web/20101231123316/http://yazamtech.com:80/en/distributor_en, 2 pages.
Docs, YazamTech, captured on Dec. 31, 2010, https://web.archive.org/web/20101231123319/http://yazamtech.com:80/en/docs, 1 page.
Documentation, YazamTech, captured on Dec. 31, 2010, https://web.archive.org/web/20101231123344/http://yazamtech.com:80/en/documentation, 1 page.
InjectorIT, YazamTech, captured on Dec. 31, 2010, https://web.archive.org/web/20101231123352/http://yazamtech.com:80/en/injectorit, 2 pages.
Products, YazamTech, captured on Dec. 31, 2010, https://web.archive.org/web/20101231084723/http://yazamtech.com:80/en/products, 2 pages.
Research, YazamTech, captured on Dec. 31, 2010, https://web.archive.org/web/20101231123359/http://yazamtech.com:80/en/research, 1 page.
SelectorIT, YazamTech, captured on Dec. 31, 2010, https://web.archive.org/web/20101231084740/http://yazamtech.com:80/en/selectorit, 4 pages.
YazamTech, captured on Dec. 31, 2010, https://web.archive.org/web/20101231084707/http://yazamtech.com:80/en, 2 pages.
ShuttleIT, YazamTech, captured on Feb. 3, 2011, https://web.archive.org/web/20110203153113/http://yazamtech.com:80/en/shuttleit, 3 pages.
YazamTech, captured on Mar. 6, 2011, https://web.archive.org/web/20110306123449/http://yazamtech.com:80/en, 2 pages.
Products, YazamTech, captured on Mar. 15, 2011, https://web.archive.org/web/20110315193104/http://yazamtech.com:80/en/products, 2 pages.
Research, YazamTech, captured on Mar. 15, 2011, https://web.archive.org/web/20110315193112/http://yazamtech.com:80/en/research, 1 page.

(56) References Cited

OTHER PUBLICATIONS

White-listing Beyond Anti-Virus, YazamTech, captured on Mar. 15, 2011, https://web.archive.org/web/20110315175925/http://yazamtech.com:80/en/white-listing-beyond-anti-virus, 1 page.
White-listing Server or Station, YazamTech, captured on Mar. 15, 2011, https://web.archive.org/web/20110315193118/http://yazamtech.com:80/en/white-listing-server-or-station, 1 page.
YazamTech, captured on Mar. 15, 2011, https://web.archive.org/web/20110315193058/http://yazamtech.com/en, 2 pages.
A single ShuttleIT system can now handle multiple directories, YazamTech, captured on Sep. 27, 2013, https://web.archive.org/web/20130927194536/http://yazamtech.com/en/single-shuttleit-system-can-now-handle-multiple-directories, 1 page.
About Us, YazamTech, captured on Sep. 27, 2013, https://web.archive.org/web/20130927194226/http://yazamtech.com/en/about-us, 3 pages.
ActualIT, YazamTech, captured on Sep. 27, 2013, https://web.archive.org/web/20130927194433/http://yazamtech.com/en/actualit, 2 pages.
ActualIT, YazamTech, captured on Sep. 27, 2013, https://web.archive.org/web/20130927195119/http://yazamtech.com/en/actualit-1, 1 page.
Contact Us, YazamTech, captured on Sep. 27, 2013, https://web.archive.org/web/20130927194337/http://yazamtech.com/en/contact, 1 page.
Distributors, YazamTech, captured on Sep. 27, 2013, https://web.archive.org/web/20130927195025/http://yazamtech.com/en/distributor_en, 1 page.
Docs, YazamTech, captured on Sep. 27, 2013, https://web.archive.org/web/20130927194307/http://yazamtech.com/en/docs, 1 page.
File Slack, YazamTech, captured on Sep. 27, 2013, https://web.archive.org/web/20130927195132/http://yazamtech.com/en/file-slack, 1 page.
Frequently Asked Questions—English, YazamTech, captured on Sep. 27, 2013, https://web.archive.org/web/20130927195242/http://yazamtech.com/en/category/faq/english, 2 pages.
Frequently Asked Questions—English, YazamTech, captured on Sep. 27, 2013, https://web.archive.org/web/20130927195230/http://yazamtech.com/en/faq/english, 3 pages.
Frequently Asked Questions, YazamTech, captured on Sep. 27, 2013, https://web.archive.org/web/20130927195218/http://yazamtech.com/en/faq, 3 pages.
InjectorIT allows the usage of a secure server, YazamTech, captured on Sep. 27, 2013, https://web.archive.org/web/20130927194459/http://yazamtech.com/en/injectorit-allows-usage-secure-server, 1 page.
New Features in SelectorIT 1.1.0, YazamTech, captured on Sep. 27, 2013, https://web.archive.org/web/20130927194511/http://yazamtech.com/en/new-features-selectorit-110, 1 page.
Products, YazamTech, captured on Sep. 27, 2013, https://web.archive.org/web/20130927194241/http://yazamtech.com/en/products, 1 page.
Research, YazamTech, captured on Sep. 27, 2013, https://web.archive.org/web/20130927194321/http://yazamtech.com/en/research, 1 page.
SelectorIT, YazamTech, captured on Sep. 27, 2013, https://web.archive.org/web/20130927195041/http://yazamtech.com/en/selectorit-0, 1 page.
SelectorIT, YazamTech, captured on Sep. 27, 2013, https://web.archive.org/web/20130927194123/http://yazamtech.com/en/selectorit, 4 pages.
SelectorIT, YazamTech, captured on Sep. 27, 2013, https://web.archive.org/web/20130927195012/http://yazamtech.com/en/selectorit?phpMyAdmin=2pTp23a-YBGPpnaPAXvSkgjFO71, 4 pages.
SelectorIT: a security solution beyond anti-virus, YazamTech, captured on Sep. 27, 2013, https://web.archive.org/web/20130927194524/http://yazamtech.com/en/selectorit-security-solution-beyond-anti-virus, 1 page.
ShuttleIT, YazamTech, captured on Sep. 27, 2013, https://web.archive.org/web/20130927195054/http://yazamtech.com/en/node/37, 1 page.
ShuttleIT, YazamTech, captured on Sep. 27, 2013, https://web.archive.org/web/20130927194354/http://yazamtech.com/en/node/9, 4 pages.
Updates, YazamTech, captured on Sep. 27, 2013, https://web.archive.org/web/20130927194253/http://yazamtech.com/en/updates_en, 1 page.
VectorIT, YazamTech, captured on Sep. 27, 2013, https://web.archive.org/web/20130927195108/http://yazamtech.com/en/injectorit-0, 1 page.
VectorIT, YazamTech, captured on Sep. 27, 2013, https://web.archive.org/web/20130927194948/http://yazamtech.com/en/vectorit, 3 pages.
White-listing Beyond Anti-Virus, YazamTech, captured on Sep. 27, 2013, https://web.archive.org/web/20130927195143/http://yazamtech.com/en/white-listing-beyond-anti-virus, 1 page.
White-listing Server or Station, YazamTech, captured on Sep. 27, 2013, https://web.archive.org/web/20130927195155/http://yazamtech.com/en/white-listing-server-or-station, 1 page.
YazamTech, captured on Sep. 27, 2013, https://web.archive.org/web/20130927193714/http://yazamtech.com/en, 2 pages.
Zip Bomb, YazamTech, captured on Sep. 27, 2013, https://web.archive.org/web/20130927195206/http://yazamtech.com/en/zip-bomb, 1 page.
YazamTech, captured on Jan. 7, 2014, https://web.archive.org/web/20140107212727/http://yazamtech.com/en , 2 pages.
YazamTech, captured on Jan. 11, 2014, https://web.archvie.org/web/20140111182504/http://yazamtech.com/en , 2 pages.
About Us, YazamTech, captured on Jan. 24, 2014, https://web.archive.org/web/20140124145938/http://yazamtech.com/en/about-us, 3 pages.
Distributors, YazamTech, captured on Jan. 24, 2014, https://web.archvie.org/web/20140124145954/http://yazamtech.com/en/distributor_en, 1 page.
VectorIT, YazamTech, captured on Jan. 25, 2014, https://web.archive.org/web/20140125221917/http://yazamtech.com/en/vectorit, 3 pages.
YazamTech, captured on Jan. 25, 2014, https://web.archive.org/web/20140125161656/http://yazamtech.com/en, 2 pages.
Contact Us, YazamTech, captured on Jan. 27, 2014, https://web.archive.org/web/20140127013125/http://yazamtech.com/en/contact, 1 page.
Docs, YazamTech, captured on Jan. 27, 2014, https://web.archive.org/web/20140127013132/http://yazamtech.com/en/docs, 1 page.
Research, YazamTech, captured on Jan. 27, 2014, https://web.archive.org/web/20140127013151/http://yazamtech.com/en/research, 1 page.
Updates, YazamTech, captured on Jan. 27, 2014, https://web.archive.org/web/20140127013214/http://yazamtech.com/en/updates_en, 1 page.
A single ShuttleIT system can now handle multiple directories, YazamTech, captured on Aug. 1, 2014, https://web.archive.org/web/20140801204953/http://yazamtech.com/en/single-shuttleit-system-can-now-handle-multiple-directories, 1 page.
About Us, YazamTech, captured on Aug. 1, 2014, https://web.archive.org/web/20140801204634/http://yazamtech.com/en/about-us, 3 pages.
ActualIT, YazamTech, captured on Aug. 1, 2014, https://web.archive.org/web/20140801204843/http://yazamtech.com/en/actualit, 2 pages.
ActualIT, YazamTech, captured on Aug. 1, 2014, https://web.archive.org/web/20140801205619/http://yazamtech.com/en/actualit-1, 1 page.
Contact Us, YazamTech, captured on Aug. 1, 2014, https://web.archive.org/web/20140801204744/http://yazamtech.com/en/contact, 1 page.
Distributors, YazamTech, captured on Aug. 1, 2014, https://web.archive.org/web/20140801205513/http://yazamtech.com/en/distributor_en, 1 page.
Docs, YazamTech, captured on Aug. 1, 2014, https://web.archive.org/web/20140801204715/http://yazamtech.com/en/docs, 1 page.
File Slack, YazamTech, captured on Aug. 1, 2014, https://web.archive.org/web/20140801205632/http://yazamtech.com/en/file-slack, 1 page.
Frequently Asked Questions—English, YazamTech, captured on Aug. 1, 2014, https://web.archive.org/web/20140801205754/http://yazamtech.com/en/category/faq/english, 2 pages.
Frequently Asked Questions—English, YazamTech, captured on Aug. 1, 2014, https://web.archive.org/web/20140801205740/http://yazamtech.com/en/faq/english, 3 pages.
Frequently Asked Questions, YazamTech, captured on Aug. 1, 2014, https://web.archive.org/web/20140801205726/http://yazamtech.com/en/faq, 3 pages.

(56) References Cited

OTHER PUBLICATIONS

InjectorIT allows the usage of a secure server, YazamTech, captured on Aug. 1, 2014, https://web.archive.org/web/20140801204911/http://yazamtech.com/en/injectorit-allows-usage-secure-server, 1 page.
New Features in SelectorIT 1.1.0, YazamTech, captured on Aug. 1, 2014, https://web.archive.org/web/20140801204925/http://yazamtech.com/en/new-features-selectorit-110, 1 page.
Products, YazamTech, captured on Aug. 1, 2014, https://web.archive.org/web/20140801204646/http://yazamtech.com/en/products, 1 page.
Research, YazamTech, captured on Aug. 1, 2014, https://web.archive.org/web/20140801204731/http://yazamtech.com/en/research, 1 page.
SelectorIT, YazamTech, captured on Aug. 1, 2014, https://web.archive.org/web/20140801204521/http://yazamtech.com/en/selectorit, 4 pages.
SelectorIT, YazamTech, captured on Aug. 1, 2014, https://web.archive.org/web/20140801205500/http://yazamtech.com/en/selectorit?phpMyAdmin=2pTp23a-YBGPpnaPAXvSkgjFO71, 4 pages.
SelectorIT, YazamTech, captured on Aug. 1, 2014, https://web.archive.org/web/20140801205537/http://yazamtech.com/en/selectorit-0, 1 page.
SelectorIT: a security solution beyond anti-virus, YazamTech, captured on Aug. 1, 2014, https://web.archive.org/web/20140801204940/http://yazamtech.com/en/selectorit-security-solution-beyond-anti-virus, 1 page.
ShuttleIT, YazamTech, captured on Aug. 1, 2014, https://web.archive.org/web/20140801205552/http://yazamtech.com/en/node/37, 1 page.
ShuttleIT, YazamTech, captured on Aug. 1, 2014, https://web.archive.org/web/20140801204802/http://yazamtech.com/en/node/9, 4 pages.
Updates, YazamTech, captured on Aug. 1, 2014, https://web.archive.org/web/20140801204702/http://yazamtech.com/en/updates_en , 1 page.
VectorIT, YazamTech, captured on Aug. 1, 2014, https://web.archive.org/web/20140801205606/http://yazamtech.com/en/injectorit-0, 1 page.
VectorIT, YazamTech, captured on Aug. 1, 2014, https://web.archive.org/web/20140801205431/http://yazamtech.com/en/vectorit, 3 pages.
White-listing Beyond Anti-Virus, YazamTech, captured on Aug. 1, 2014, https://web.archive.org/web/20140801205647/http://yazamtech.com/en/white-listing-beyond-anti-virus, 1 page.
White-listing Server or Station, YazamTech, captured on Aug. 1, 2014, https://web.archive.org/web/20140801205659/http://yazamtech.com/en/white-listing-server-or-station, 1 page.
YazamTech, captured on Aug. 1, 2014, https://web.archive.org/web/20140801204051/http://yazamtech.com/en , 2 pages.
Zip Bomb, YazamTech, captured on Aug. 1, 2014, https://web.archive.org/web/20140801205712/http://yazamtech.com/en/zip-bomb, 1 page.
YazamTech, captured on Mar. 20, 2015, https://web.archive.org/web/20150320024752/http://www.yazamtech.com:80/en, 2 pages.
A single ShuttleIT system can now handle multiple directories, YazamTech, captured on Mar. 21, 2015, https://web.archive.org/web/20150321022719/http://www.yazamtech.com:80/en/single-shuttleit-system-can-now-handle-multiple-directories, 1 page.
About Us, YazamTech, captured on Mar. 21, 2015, https://web.archive.org/web/20150321060726/http://www.yazamtech.com:80/en/about-us, 3 pages.
ActualIT, YazamTech, captured on Mar. 21, 2015, https://web.archive.org/web/20150321022658/http://www.yazamtech.com:80/en/actualit, 2 pages.
InjectorIT allows the usage of a secure server, YazamTech, captured on Mar. 21, 2015, https://web.archive.org/web/20150321022704/http://www.yazamtech.com:80/en/injectorit-allows-usage-secure-server, 1 page.
New Features in SelectorIT 1.1.0, YazamTech, captured on Mar. 21, 2015, https://web.archive.org/web/20150321022709/http://www.yazamtech.com:80/en/new-features-selectorit-110, 1 page.
SelectorIT, YazamTech, captured on Mar. 21, 2015, https://web.archive.org/web/20150321060700/http://www.yazamtech.com:80/en/selectorit, 4 pages.
SelectorIT: a security solution beyond anti-virus, YazamTech, captured on Mar. 21, 2015, https://web.archive.org/web/20150321022714/http://www.yazamtech.com:80/en/selectorit-security-solution-beyond-anti-virus, 1 page.
ShuttleIT, YazamTech, captured on Mar. 21, 2015, https://web.archive.org/web/20150321060625/http://www.yazamtech.com:80/en/node/9, 4 pages.
Updates, YazamTech, captured on Mar. 21, 2015, https://web.archive.org/web/20150321022726/http://www.yazamtech.com:80/en/updates_en, 1 page.
VectorIT, YazamTech, captured on Mar. 21, 2015, https://web.archive.org/web/20150321060706/http://www.yazamtech.com:80/en/vectorit, 3 pages.
YazamTech, captured on Mar. 21, 2015, https://web.archive.org/web/20150321060721/http://www.yazamtech.com:80/en, 2 pages.
YazamTech, captured on Apr. 6, 2015, https://web.archive.org/web/20150406175817/http://www.yazamtech.com:80/en, 2 pages.
YazamTech, captured on Apr. 23, 2015, https://web.archive.org/web/20150423110533/http://www.yazamtech.com:80/en, 2 pages.
Updates, YazamTech, captured on Jun. 28, 2015, https://web.archive.org/web/20150628122651/http://www.yazamtech.com:80/en/updates_en, 1 page.
YazamTech, captured on Jun. 28, 2015, https://web.archive.org/web/20150628122630/http://www.yazamtech.com:80/en, 2 pages.
Products, YazamTech, captured on Jul. 1, 2015, https://web.archive.org/web/20150701010841/http://www.yazamtech.com:80/en/products, 1 page.
SelectorIT, YazamTech, captured on Jul. 2, 2015, https://web.archive.org/web/20150702095314/http://www.yazamtech.com:80/en/selectorit-0, 1 page.
YazamTech, captured on Jul. 11, 2015, https://web.archive.org/web/20150711093404/http://www.yazamtech.com:80/en, 2 pages.
Additional Products, YazamTech, captured on Aug. 30, 2016, https://web.archive.org/web/20160830010641/http://www.yazamtech.com/#!additional-products/cy7, 2 pages.
Company, YazamTech, captured on Aug. 30, 2016, https://web.archive.org/web/20160830010641/http://www.yazamtech.com/#!company/hl4mz, 1 page.
Contact us, YazamTech, captured on Aug. 30, 2016, https://web.archive.org/web/20160830010641/http://www.yazamtech.com/#!contact/c24vg, 1 page.
Distributors, YazamTech, captured on Aug. 30, 2016, https://web.archive.org/web/20160830010641/http://www.yazamtech.com/#!distributors/cohj, 2 pages.
FAQ, YazamTech, captured on Aug. 30, 2016, https://web.archive.org/web/20160830010641/http://www.yazamtech.com/#!faq/cirw, 1 page.
Which actions can be expected from the content filtering system?, YazamTech, captured on Aug. 30, 2016, https://web.archive.org/web/20160830010641/http://www.yazamtech.com/#!faqs-11/c148p, 1 page.
What are the advantages of YazamTech SelectorIT?, YazamTech, captured on Aug. 30, 2016, https://web.archive.org/web/20160830010641/http://www.yazamtech.com/#!faqs-12/c18iv, 1 page.
What are the YazamTech values?, YazamTech, captured on Aug. 30, 2016, https://web.archive.org/web/20160830010641/http://www.yazamtech.com/#!faqs-14/cg8a, 1 page.
Who are the applicable customers for YazamTech products?, YazamTech, captured on Aug. 30, 2016, https://web.archive.org/web/20160830010641/http://www.yazamtech.com/#!faqs-15/c1xmc, 1 page.
Home, YazamTech, captured on Aug. 30, 2016, https://web.archive.org/web/20160830010641/http://www.yazamtech.com/, 2 pages.
YazamTech Updates, YazamTech, captured on Aug. 30, 2016, https://web.archive.org/web/20160830010641/http://www.yazamtech.com/#!new-post-updates-page/c1gp0, 4 pages.
Our Team, YazamTech, captured on Aug. 30, 2016, https://web.archive.org/web/20160830010641/http://www.yazamtech.com/#!our_team/cqn6, 2 pages.
Products, YazamTech, captured on Aug. 30, 2016, https://web.archive.org/web/20160830010641/http://www.yazamtech.com/#!products/c5ro, 2 pages.

(56) References Cited

OTHER PUBLICATIONS

SelectorIT, YazamTech, captured on Aug. 30, 2016, https://web.archive.org/web/20160830010641/http://www.yazamtech.com/#!selectorit/ccz3, 1 page.
ShuttleIT, YazamTech, captured on Aug. 30, 2016, https://web.archive.org/web/20160830010641/http://www.yazamtech.com/#!shuttelit/cv2j, 1 page.
Solutions, YazamTech, captured on Aug. 30, 2016, https://web.archive.org/web/20160830010641/http://www.yazamtech.com/#!solutions/c1mbk, 2 pages.
MetaDefender Email Security—4.7 Support for password protected attachments, OPSWAT, retrieved Sep. 27, 2018, https://onlinehelp.opswat.com/emailv4/4.7_Support_for_password_protected_attachments.html, 9 pages.
בלמ"ס (Hebrew-language document A), 11 pages.
SelectorIT דו"ח בדיקות ביטחון למערכת הלבנה (Hebrew-language document B), Sep. 11, 2011, 6 pages.
National Security Agency, "Hidden Data and Metadata in Adobe PDF Files: Publication Risks and Countermeasures" (Jul. 27, 2008).
Chen et al., "An Analysis of Browser Domain-Isolation Bugs and a Light-Weight Transparent Defense Mechanism", Oct. 29-Nov. 2, 2007, ACM, pp. 2-10 (2007).
Dong et al., "Protecting Sensitive Web Content from Client-Side Vulnerabilities with CRYPTONs", Nov. 4-8, 2013, ACM, pp. 1311-1324 (2013).

\* cited by examiner

| ID | DATE | User Name/Email | To | Comment/ Subject | Sanitized File Name | Sanitized File | Original File | Status | Approve |
|---|---|---|---|---|---|---|---|---|---|
| | | Filter by Report 422 | Approve Selected Items 424 | Reject Selected Items 426 | Analyze Selected Items 428 | | | | |
| ☐ 213 | 05.01.17 03:05 | def@abc.com | abc@def.com | Hello | 277a88d1-17ae-4945-85aa-944/0fb3e302.eml | ☒ | ☒ | ⚠ | ✓ |
| ☐ 212 | 05.01.17 03:04 | def@abc.com | ghi@def.com | Check this out | 8131c2d9-259a-4c8b-b536-038da72e8a3f.eml | ☒ | ☒ | ☺ | ✓ |
| ☐ 211 | 05.01.17 03:04 | def@abc.com | jkl@xyz.com | Tomorrow's Meeting | e2fdb69b-afdb-44aa-8ca-1615389ab697.eml | ☒ | ☒ | ⊗ | ✗ |
| 404 | 406 | 408 | 410 | 412 | 414 | 415 | 416 | 418 | 420 |

FIG. 4

DETERMINING MALWARE PREVENTION BASED ON RETROSPECTIVE CONTENT SCAN

PRIORITY CLAIM

This application is a continuation of U.S. application Ser. No. 15/672,037, filed Aug. 8, 2017, issued as U.S. Pat. No. 9,922,191, which claims priority under 35 U.S.C. § 119 to U.S. provisional patent application No. 62/442,452, filed on Jan. 5, 2017, U.S. provisional patent application No. 62/450,605, filed on Jan. 26, 2017, and U.S. provisional patent application No. 62/473,902, filed on Mar. 20, 2017. Each of the aforementioned applications is incorporated herein by reference in its entirety.

BACKGROUND

Malware-based attacks pose significant risks to computer systems. Malware includes any malicious content, code, scripts, active content, or software designed or intended to damage, disable, or take control over a computer or computer system. Examples of malware include computer viruses, worms, trojan horses, ransomware, spyware, shellcode, etc. Malware may be received into a computer system in various ways, commonly through electronic communications such as email and downloads from websites. Computer systems are known to implement various protective tools at end-user computer devices or gateways or access points to the computer system for screening or detecting malicious content before the malicious content is allowed to infect the computer system. Conventional tools commonly rely on the ability to identify or recognize a particular malicious threat or characteristics known to be associated with malicious content or activity.

For example, common attempts to identify malicious content include screening incoming documents at a host computer or server based on a comparison with known malicious signatures. Such signature-based malware detection techniques, however, are incapable of identifying malicious content for which a malicious signature has not yet been identified. Accordingly, it is generally not possible to identify new malicious content or subtle variations of existing malicious content using signature-based detection methods. Furthermore, in many cases, malicious content is embedded in otherwise legitimate content, documents or files having proper structure and characteristics, and the malicious content may also be disguised to hide the malicious nature of the content, so that the malicious content appears to be innocuous. Thus, even upon inspection of a document according to known malware scanning techniques, it may be difficult to identify malicious content.

Other conventional tools for identifying malicious content implement behavior-based techniques or heuristics to identify characteristics of known malicious content or other suspicious activity or behavior. One such technique implements a "sandbox," (e.g., a type of secured, monitored, or virtual operating system environment) which can be used to virtually execute untested or untrusted programs, files, or code without risking harm to the host machine or operating system. That is, conventional sandbox techniques may execute or detonate a file while monitoring the damage or operations post-detonation. Some operations that may be monitored included operations for writing to disk, initiating network activity, the spawning of new processes and any other potentially suspicious operations. These techniques, however, also suffer from the inability to identify new yet-to-be-identified exploits, e.g., so called zero-day exploits. Some sophisticated malware have also been developed to evade such "sandbox" techniques by halting or skipping if it detects that it is running in such a virtual execution or monitored environment. Furthermore, clever hackers consistently evolve their code to include delayed or staged attacks that may not be detected from evaluation of a single file, for example, or may lay in wait for a future unknown process to complete an attack. Thus, in some situations it may be too computationally intensive or impracticable to identify some malware exploits using conventional sandbox techniques.

Other tools, which help overcome limitations of conventional malware detection techniques have recently been implemented and include those based on a concept of content disarm and reconstruction (CDR), or content sanitization, which generally refers to techniques for analyzing or deconstructing content, removing aspects of the content that pose risks, and reconstructing the content to be at least partly usable by an end user. Other techniques exist for changing a format of the content, for example, to hopefully destroy any malicious content that may be part of the received content. Such CDR techniques aim to remove or disarm any malicious content that may be included in content and do not necessarily require prior detection of malicious content in the received content.

A similar concept for protecting computer systems from malware entering a computer system from web browsing activities includes web browser isolation environments that transform web content before providing the web content to an end-user computer device. Some web browser isolation environments generate a visual representation of the web content that is sent to a requesting end-user as opposed to live, potentially malicious web content that would otherwise be received by a browser. Like CDR solutions, web browser isolation environments aim to prevent any malicious web content from being received into the computer system or accessed by an end user and do not necessarily require prior detection of any malicious web content being accessed by a browser.

Thus, CDR and web browser isolation techniques may provide an advantage for protecting computer systems from yet-to-be identified attacks. But, without ever detecting the presence of malicious content it is difficult to determine the effectiveness of a CDR or web browser isolation solution in having prevented a potential malware attack.

Current systems do not provide capabilities for assuring or verifying the effectiveness of a CDR process or other content transformation processes performed for received content. Also, current systems do not provide capabilities for determining the effectiveness of a CDR or other solution (e.g., web browser isolation solution) in having prevented a potential attack on the computer system.

Thus, there is a need in computer systems for techniques to mitigate the risks posed by malware attacks that can be verifiable or for which successful prevention of potential attacks can be determined.

SUMMARY

In the following description certain aspects and embodiments of the present disclosure will become evident. It should be understood that the disclosure, in its broadest sense, could be practiced without having one or more features of these aspects and embodiments. It should also be understood that these aspects and embodiments are examples only.

The disclosed embodiments include a method for retrospectively analyzing original input content to detect malicious content in a computer system, the original input content having been previously processed to create modified input content and prevented from being received by an intended recipient. The method, performed by a processor, includes accessing the original input content or a characteristic associated with the original input content, analyzing the original input content or the characteristic associated with the original input content based on a malware detection algorithm to determine whether the original input content includes suspected malicious content, and when it is determined that the original input content includes suspected malicious content, analyzing the modified input content to determine whether the modified input content includes the suspected malicious content. The malware detection algorithm would include at least one update of a signature or behavioral characteristic that was not included in the malware detection algorithm when the modified input content was created.

The malware detection algorithm is used to analyze the original input content based on a set of signatures of a database of known malicious content, wherein the set of signatures includes at least one signature not included in the database when the modified input was created. The malware detection algorithm also analyzes the original input content based on a set of behavioral characteristics of known malicious content included in a database, wherein the set of behavioral characteristics includes at least one behavior characteristic not included in the database when the modified input content was created. The analyzing of the original input content based on a set of behavioral characteristics may be performed in a monitored run environment.

In one disclosed embodiment, analyzing the original input content is performed responsive to a trigger, which may include an update to the malware detection algorithm. In some embodiments, the trigger may include at least one signature being added to a database of known malicious content, and/or at least one behavioral characteristic being added to a database of behavioral characteristics of known malicious content.

A disclosed embodiment includes generating a notification when it is determined that the original input content includes suspected malicious content. The disclosed embodiment also includes generating a notification when it is determined that the modified input content does not include the suspected malicious content. In the disclosed embodiment, the notification includes a report indicating at least one change in a digital value of the modified input content that caused the determined suspected malicious content to be disarmed.

In a disclosed embodiment, the original input content is stored in a storage area of the computer system configured to prevent infection of the computer system by any malicious content included in the original input content. The original input content may include a copy or a portion of original input content received by the computer system. The original input content may include at least one of a file received by the computer system or a subset of content of the file received by the computer system. The characteristic associated with the original input content may include a hash or other value representative of or associated with the original input content.

In one disclosed embodiment, the accessing operation is performed responsive to receiving a selection of the original input content via an interface. The interface may be configured to display a plurality of original input content having been previously processed to generate a plurality of modified input content, and receive the selection via a user input on the interface. The selection of the original input content may be received via an application programming interface.

The method for retrospectively analyzing original input content to detect malicious content in a computer system, where the original input content was previously processed to generate modified input content and prevented from being received by an intended recipient, may comprise accessing the original input content or a characteristic associated with the original input content, analyzing the original input content or the characteristic associated with the original input content based on a malware detection algorithm to determine whether the original input content includes or is associated with suspected malicious content (wherein the malware detection algorithm includes at least one update of a blacklist item, signature, or behavioral characteristic that was not included in the malware detection algorithm when the modified input content was generated), and when it is determined that the original input content includes or is associated with suspected malicious content, generating a report indicating that suspected malicious content was modified in the previously processed original input content.

In the disclosed embodiment, the original input content may include web content (that is, content from or accessible from a website), the modified input content may include a transformed visual representation of the web content, and the characteristic associated with the original input content may include a URL, or other identifier, such as a hostname or domain name associated with the web content. The malware detection algorithm may include a comparison of the URL or other identifier with a blacklist of URLs or identifiers known to be associated with malicious content.

Additional disclosed embodiments include a system for performing a method for retrospectively analyzing original input content to detect malicious input content where the original input content has been previously processed to generate modified input content and prevented from being received by an intended recipient. The system comprises a memory device storing a set of instructions, and a processor configured to execute the set of instructions to perform a method according to the disclosed embodiments.

In accordance with additional embodiments of the present disclosure, a computer-readable medium is disclosed that stores instructions that, when executed by a processor(s), causes the processor(s) to perform operations consistent with one or more disclosed methods.

It is to be understood that both the foregoing general description and the following detailed description are by example and explanatory only, and are not restrictive of the disclosed embodiments, as claimed.

BRIEF DESCRIPTION OF THE DRAWINGS

The subject matter regarded as the invention is particularly pointed out and distinctly claimed in the concluding portion of the specification. The disclosed principles, however, both as to organization and method of operation, together with objects, features, and advantages thereof, may best be understood by reference to the following detailed description when read with the accompanying drawings in which:

FIG. 4 is an example interface, consistent with the disclosed embodiments;

Figure 1:
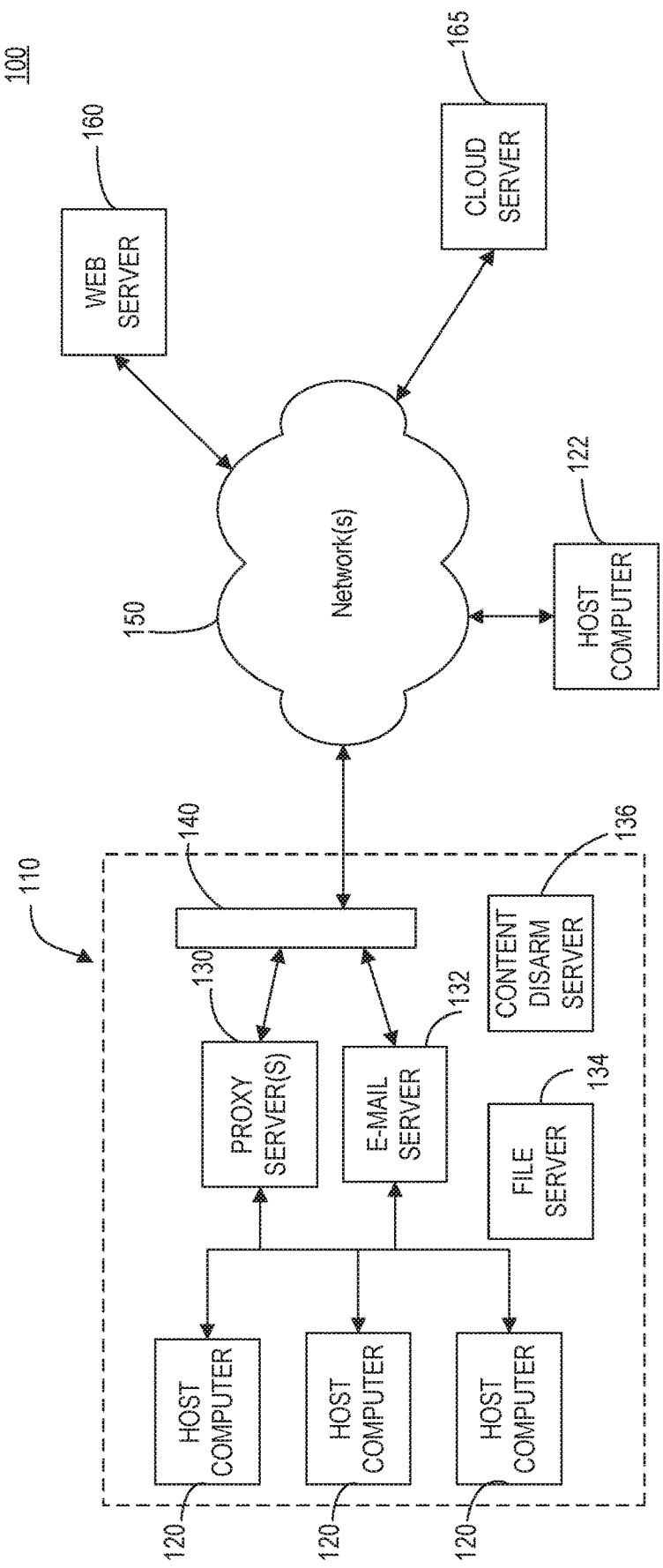
FIG. 1 is a schematic block diagram of an example computing environment consistent with the disclosed embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence. Additionally, some of the described embodiments or elements thereof can occur or be performed simultaneously, at the same point in time, or concurrently.

One technique hackers use to obtain control of a victim computer or computing environment is through the execution of malicious code at the victim computer or computing environment using malicious content received into a computer system via electronic files and electronic communications, such as via email or via web browsing, for example. The malicious code may be any form of malware including computer viruses, worms, trojan horses, ransomware, spyware, shellcode, etc. The disclosed embodiments implement techniques for disarming, sanitizing, or otherwise preventing malicious content from entering a computer system via received electronic content. In the disclosed embodiments, any (or all) input content received by a computer system may be modified or transformed to thereby generate modified input content in which any malicious code included in the input content is excluded, disarmed, or otherwise prevented from causing its intended malicious effects. The modified input content may then be sent to an intended recipient instead of the original input content or until the original input content may be deemed safe for releasing to the intended recipient. In some embodiments, the original input content may be stored in a protective storage area and thus may be considered to be quarantined in the computer system, such that any malicious content in the original input content is unable to attack the computer system.

The disclosed embodiments implement techniques for tracking original input content or certain types of original input content received by the computer system, and associating the original input content (or copies or characteristics thereof) with the respective generated modified input content that may be passed on to an intended recipient. The original input content may be quarantined in the computer system or otherwise prevented from being received or accessed by an intended recipient, so that malicious content that may be included in the original content is unable to infect the computer system. The disclosed embodiments may generate the modified input content without regard to whether malicious content is detected in the input content and without regard to whether the input content is even analyzed by one or more malware detection techniques. The content disarming or sanitization techniques of the disclosed embodiments thus may prevent malware infection without malware detection. Even if one or more malware detection techniques are implemented in association with receiving input content and generating modified input content, certain types of malicious content or unknown malicious content may not be detected, such as zero-day attacks. Thus, the disclosed embodiments implement additional techniques for later determining whether any malicious content, including zero-day attacks, were disarmed or otherwise neutralized in the modified input content that may have been passed on to an intended recipient in a computer system.

The disclosed embodiments may implement this additional functionality by analyzing the original input content using one or more malware detection techniques subsequent to generating the modified input content. In some embodiments, the original input content may be analyzed upon activation of one or more triggers, such as a passage of time, an update to one or more malware detection techniques or databases, upon user selection, as well as others.

Because the disclosed embodiments may associate original input content with respective modified input content, the disclosed techniques also enable a determination as to whether the implemented disarming or sanitization techniques for generating the modified input content were effective to neutralize an attack that is subsequently identified in the analyzed original input content. The disclosed embodiments thus enable a computer system to subsequently identify potential zero-day attacks that were prevented from entering the computer system.

The disclosed embodiments may be provided as part of a data sanitization or CDR process for sanitizing or modifying electronic content, including files or documents or web content, received at a victim computer or a computer system, such as via e-mail or downloaded from the web, etc. The disclosed embodiments may implement any one or more of several CDR techniques applied to received content based on the type of content, for example, or other factors. Some example CDR techniques that may be implemented together with the disclosed embodiments include document reformatting or document layout reconstruction techniques, such as those disclosed in U.S. Pat. No. 9,047,293, for example, the content of which is expressly incorporated herein by reference. Additional example CDR techniques include those for altering values of digital content, such as those disclosed in copending U.S. patent application Ser. Nos. 15/441,860 and 15/441,904, filed Feb. 24, 2017, and techniques for preventing automatic execution of active content, such as that disclosed in U.S. application Ser. No. 15/616,577, filed Jun. 7, 2017, the contents of each of which are also expressly incorporated herein by reference.

The disclosed embodiments may also be provided as part of a web browsing isolation environment or other web browsing solutions that sanitize or transform web content before passing the web content to a requesting recipient or computer. In some web browsing isolation environments, any requested web content is rendered in a protected environment designed to isolate an attack from the computer system and then transformed to provide only a visualization of the rendered web content to the requesting user. The protected environment may be a virtual environment or other segregated or monitored run environment that does not pose risks to the computer system. Thus, the web browser or other interface of a requesting recipient may receive from the isolation environment only a transformed rendering of the requested web content free of any malicious content that may have been included in the web content. Throughout this disclosure, the term original input content includes web content, as well as files accessed via the web, and the term modified input content includes any transformed or modified web content passed on to a requesting user or computer system.

Reference is now made to FIG. 1, which is a block diagram of an example computing environment 100, consistent with example embodiments of the present disclosure. As shown, system 100 may include a plurality of computing systems interconnected via one or more networks 150. A first network 110 may be configured as a private network. The first network 110 may include a plurality of host computers 120, one or more proxy servers 130, one or more e-mail servers 132, one or more file servers 134, a content disarm server 136, and a firewall 140. Any of proxy server 130, e-mail server 132, or firewall 140 may be considered an edge or gateway network device that interfaces with a second network, such as network 150. Host computers 120 and other computing devices of first network 110 may be capable of communicating with one or more web servers 160, cloud servers and other host computers 122 via one or more additional networks 150.

Networks 110 and 150 may comprise any type of computer networking arrangement used to exchange data among a plurality of computing components and systems. Network 110 may include a single local area network or a plurality of distributed interconnected networks and may be associated with a firm or organization. The interconnected computing systems of network 110 may be within a single building, for example, or distributed throughout the United States and globally. Network 110, thus, may include one or more private data networks, a virtual private network using a public network, one or more LANs or WANs, and/or any other suitable combination of one or more types of networks, secured or unsecured.

Network(s) 150 likewise may comprise any type of computer networking arrangement for facilitating communication between devices of the first network 110 and other distributed computing components such as web servers 160, cloud servers 165, or other host computers 122. Web servers 160 and cloud servers 165 may include any configuration of one or more servers or server systems interconnected with network 150 for facilitating communications and transmission of content or other data to the plurality of computing systems interconnected via network 150. In some embodiments, cloud servers 165 may include any configuration of one or more servers or server systems providing content or other data specifically for the computing components of network 110. Network 150 may include the Internet, a private data network, a virtual private network using a public network, a Wi-Fi network, a LAN or WAN network, and/or other suitable connections that may enable information exchange among various components of system 100. Network 150 may also include a public switched telephone network ("PSTN") and/or a wireless cellular network.

Host computers 120 and 122 may include any type of computing system configured for communicating within network 110 and/or network 150. Host computers 120, 122 may include, for example, a desktop computer, laptop computer, tablet, smartphone and any other network connected device such as a server, server system, printer, as well as other networking components.

File server 134 may include one or more file servers, which may refer to any type of computing component or system for managing files and other data for network 110. In some embodiments, file server 134 may include a storage area network comprising one or more servers or databases, or other configurations known in the art.

Content disarm server 136 may include one or more dedicated servers or server systems or other computing components or systems for performing aspects of the example processes for disarming input content and retrospectively analyzing the input content. Accordingly, content disarm server 136 may be configured to perform aspects of a CDR solution, and may also be configured to enable a web browsing isolation environment, as well as perform other known malware mitigation techniques. Content disarm server 136 may be provided as part of network 110, as shown, or may be accessible to other computing components of network 110 via network 150, for example In some embodiments, some or all of the functionality attributed to content disarm server 136 may be performed in a host computer 120. Content disarm server 136 may be in communication with any of the computing components of first network 110, and may function as an intermediary system to receive input content, including input electronic files and web content, from proxy server 130, e-mail server 132, file server 134, host computer 120, or firewall 140 and return, forward, or store a modified input file or modified input content according to the example embodiments. In some embodiments, content disarm server 136 may be configured as an edge device to intercept electronic communications entering a network.

Content disarm server 136 may also be configured to perform one or more malware detection algorithms, such as a blacklist or signature-based malware detection algorithm, or other known behavior-based algorithms or techniques for detecting malicious activity in a monitored run environment, such as a "sandbox," for example. Accordingly, content disarm server 136 may include or may have access to one or more databases of malware signatures or behavioral characteristics, or one or more blacklists of known malicious URLs, or other similar lists of information (e.g., IP addresses, hostnames, domains, etc.) associated with malicious activity. Content disarm server 136 may also access one or more other service providers that perform one or more malware detection algorithms as a service. In some embodiments, one or more malware detection algorithms may be implemented together with the disclosed techniques to detect any malicious content included in input content. For example, one or more malware detection algorithms may be implemented to first screen input content for known malicious content, whereby the example embodiments are then implemented to disarm any malicious content that may have been included in the input content and that may not have been detected by the one or more malware detection algorithms. Likewise, content disarm server 136 may also be configured to perform one or more algorithms on received input content for identifying suspicious content.

In some embodiments, content disarm server 136 and or file server 134 may include a dedicated repository for storing input content (and/or characteristics thereof) received by content disarm server 136. The dedicated repository may be restricted from general access by users or computers of network 110. The dedicated repository may be a protected storage or storage area that may prevent any malicious content stored therein from attacking other computing devices of the computer system. In some embodiments, all or select input content may be stored in the dedicated repository for a predetermined period of time or according to a policy of a network administrator, for example. In some embodiments, characteristics associated with the original input content, such as a hash of an input content file, or a URL of requested web content, or other identifiers, etc., may be stored in addition to or instead of the original input content.

Proxy server 130 may include one or more proxy servers, which may refer to any type of computing component or system for handling communication requests between one or more interconnected computing devices of network 110. In some embodiments, proxy server 130 may be configured as one or more edge servers positioned between a private network of first network 110, for example, and public network 150.

E-mail server 132 may include one or more e-mail servers, which may refer to any type of computing component or system for handling electronic mail communications between one or more interconnected computing devices of network 110 and other devices external to network 110. In some embodiments, e-mail server 132 may be configured as one or more edge servers positioned between a private network of first network 110, for example, and public network 150.

First network 110 may also include one or more firewalls 140, implemented according to any known firewall configuration for controlling communication traffic between first network 110 and network 150. In some embodiments, firewall 140 may include an edge firewall configured to filter communications entering and leaving first network 110. Firewall 140 may be positioned between network 150 and one or more of proxy server 130 and e-mail server 132. In the embodiment shown, proxy server 130, e-mail server 132 and firewall 140 are positioned within first network 110, however, other configurations of network 110 are contemplated by the present disclosure. For example, in another embodiment, one or more of the proxy server 130, e-mail server 132 and firewall 140 may be provided external to the first network 110. Any other suitable arrangement is also contemplated. Additionally, other networking components, not shown, may be implemented as part of first network 110 or external to network 110 for facilitating communications within the first network 110 and with other external networks, such as network 150.

As described in greater detail below, the processes of the example embodiments may be implemented at any one of the computing devices or systems shown in FIG. 1, including host computer 120, 122, proxy server 130, e-mail server 132, file server 134, content disarm server 136, firewall 140, and cloud server 165.

Figure 2:
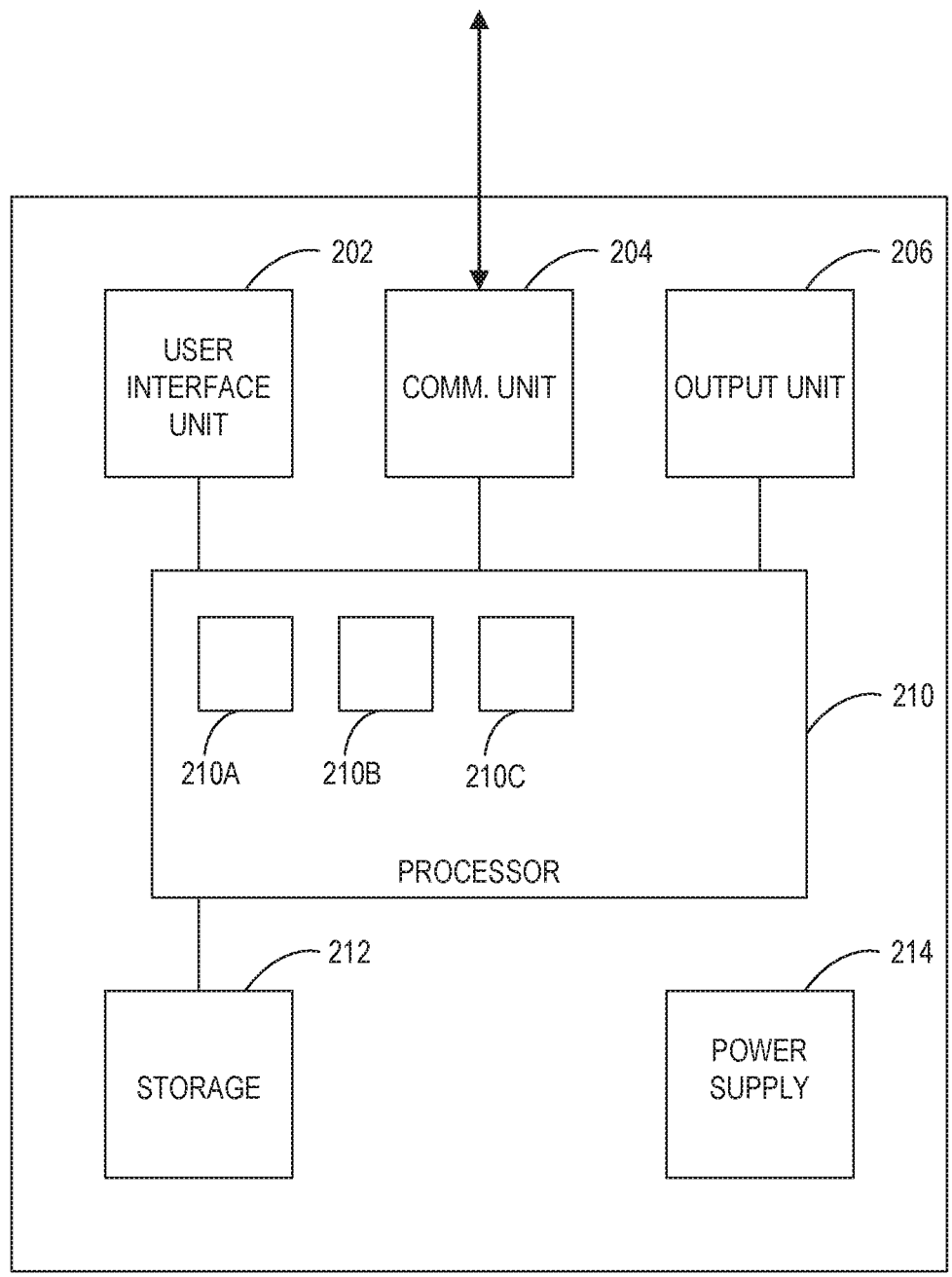
FIG. 2 is a schematic block diagram of an example computing system adapted to perform aspects of the disclosed embodiments.

Reference is now made to FIG. 2, which is a schematic block diagram of an example computing system 200 adapted to perform aspects of the disclosed embodiments. According to the example embodiments, computing system 200 may be embodied in one or more computing components of computing environment 100. For example, computing system 200 may be provided as part of host computer 120,122, proxy server 130, e-mail server 132, file server 134, content disarm server 136 or cloud server 165, for example. In some embodiments, computing system 200 may not include each element or unit depicted in FIG. 2. Additionally, one of ordinary skill in the art would understand that the elements or units depicted in FIG. 2 are examples only and a computing system according to the example embodiments may include additional or alternative elements than those shown.

Computing system 200 may include a controller or processor 210, a user interface unit 202, communication unit 204, output unit 206, storage unit 212 and power supply 214. Controller/processor 210 may be, for example, a central processing unit processor (CPU), a chip or any suitable computing or computational device. Controller/processor 210 may be programmed or otherwise configured to carry out aspects of the disclosed embodiments.

Controller/processor 210 may include a memory unit 210A, which may be or may include, for example, a Random Access Memory (RAM), a read only memory (ROM), a Dynamic RAM (DRAM), a Synchronous DRAM (SDRAM), a double data rate (DDR) memory chip, a Flash memory, a volatile memory, a non-volatile memory, a cache memory, a buffer, a short term memory unit, a long term memory unit, or other suitable computer-readable memory units or storage units. Memory unit 210A may be or may include a plurality of possibly different memory units.

Controller/processor 210 may further comprise executable code 210B which may be any executable code or instructions, e.g., an application, a program, a process, task or script. Executable code 210B may be executed by controller 210 possibly under control of operating system 210C. For example, executable code 210B may be an application that when operating performs one or more aspects of the example embodiments. Executable code 210B may also include one or more applications configured to render input content, so as to open, read, edit, and otherwise interact with the rendered content. Examples of a rendering application include one of various Microsoft® Office® suite of applications, a PDF reader application or any other conventional application for opening conventional electronic documents, as well as a web browser for accessing web content.

User interface unit 202 may be any interface enabling a user to control, tune and monitor the operation of computing system 200, including a keyboard, touch screen, pointing device, screen, and audio device such as loudspeaker or earphones.

Communication unit 204 may be any communication supporting unit for communicating across a network that enables transferring, i.e. transmitting and receiving, digital and/or analog data, including communicating over wired and/or wireless communication channels according to any known format. Communication unit 204 may include one or more interfaces known in the art for communicating via local (e.g., first network 110) or remote networks (e.g., network 150) and or for transmitting or receiving data via an external, connectable storage element or storage medium.

Output unit 206 may be any visual and/or aural output device adapted to present user-perceptible content to a user, such as media content. Output unit 206 may be configured to display web content or, for example, to display images embodied in image files, to play audio embodied in audio files and present and play video embodied in video files. Output unit 206 may comprise a screen, projector, personal projector and the like, for presenting image and/or video content to a user. Output unit 206 may comprise a loudspeaker, earphone and other audio playing devices adapted to present audio content to a user.

Storage unit 212 may be or may include, for example, a hard disk drive, a floppy disk drive, a Compact Disk (CD) drive, a CD-Recordable (CD-R) drive, solid state drive (SSD), solid state (SD) card, a Blu-ray disk (BD), a universal serial bus (USB) device or other suitable removable and/or fixed storage unit. Data or content, including user-perceptible content may be stored in storage unit 212 and may be loaded from storage 212 into memory unit 210A where it may be processed by controller/processor 210. For example, memory 210A may be a non-volatile memory having the storage capacity of storage unit 212.

Power supply 214 may include one or more conventional elements for providing power to computing system 200 including an internal batter or unit for receiving power from an external power supply, as is understood by one of ordinary skill in the art.

Figure 3:
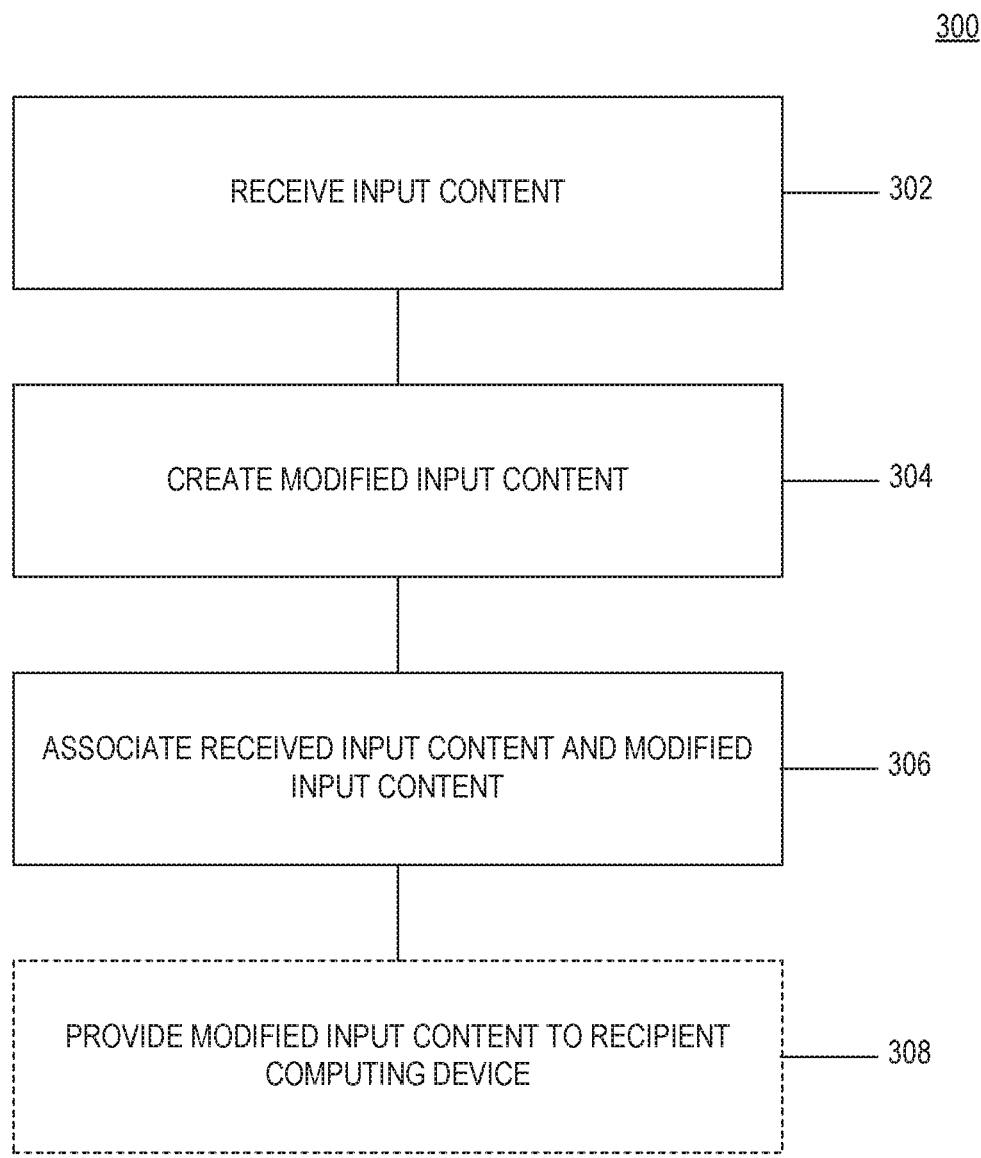
FIG. 3 is a flowchart of an example process for modifying input content, consistent with the disclosed embodiments.

Reference is now made to FIG. 3, which is a flowchart of an example process for modifying received original input content, which in some embodiments may include an input file or document received in an electronic communication, such as electronic mail or accessed via a web browser. According to the example embodiments, process 300 may be implemented to disarm or neutralize or otherwise prevent malicious content in received original input content, in whatever form, from being passed on to an intended recipient or computing device.

At operation 302, input content (e.g., original input content) may be received or accessed by a computing system, such as computing system 200, which may be included in any of the computing elements in computing environment 100, including host computer 120, 122, proxy server 130, e-mail server 132, file server 134, content disarm server 136 or cloud server 165, for example. In some embodiments, for example, the input content is received by a host computer 120, 122 that may be operated by an end-user. In other embodiments, the input content may be intended for host computer 120, 122 (or requested by host computer 120, 122) and is received by an intermediary computing system, such as proxy server 130, e-mail server 132, or firewall 140. In some embodiments, the input content may be received by a file server 134 or cloud server 165. Additionally, or alternatively, the input content may be received or accessed by content disarm server 136, from any of the computing components within network 110 or in communication with network 110.

The input content may be received or accessed by computing system 200 by any means known in the art, including such as by importing locally via an external storage device, downloading or otherwise receiving from a remote web-server, file server, or content server, for example, or by receiving via e-mail or a web browser or any other means for accessing or receiving content. An input file may be a file received or requested by a user of a computing system or other files accessed by processes or other applications executed on a computing system that may not necessarily be received or requested by a user of the computing system.

Received content or input content according to the disclosed embodiments may include any form of electronic content, including a file, document, an e-mail, web content, etc., or other objects that may be run, processed, opened or executed by an application or operating system of the victim computer or computing device. Malicious content can be embedded among seemingly legitimate received content or input content. An input file according to the disclosed embodiments may include any file or file-like content, such as an embedded object or script, that is processed, run, opened or executed by an application or operating system of a computing system. Input content may include electronic mail, for example, or streamed content or other web content. Thus, while some embodiments of the present disclosure refer to an input file or document, the disclosed techniques are also applicable to objects within or embedded in an input file or to input content generally, without consideration as to whether it can be characterized as a file, document, or object.

According to some embodiments, one or more rules may be applied by the receiving computing system (or other intermediary computing system) to received input content or files according to known techniques for identifying trusted or potentially suspicious or malicious input files or otherwise suspicious or malicious content. For example, a preliminary analysis of an input file or other input content may include determining the source of the input file, the file type, file structure, the process accessing the file, or any other characteristics associated with the input file that may enable a determination as to a potential for an input file to include malicious content. A preliminary analysis is optional, but in some embodiments it may be useful to first screen input content for malicious content or characteristics known or suspected to be associated with malicious content or activity or otherwise suspicious content.

The disclosed embodiments may be implemented with respect to any and all content identified in a document, file, or other received or input content, without regard to whether the content or the document itself is deemed suspicious in advance or before the sanitization is performed. Suspicious content may or may not include malicious active content. Suspicious content refers, for example, to a situation where input content may potentially or more likely include malicious active content, such as when the received content comes from or is associated with an untrusted source. Content may be deemed suspicious based on one or more characteristics of the received input content itself or the manner in which it is received, as well as other factors that alone or together may cause suspicion. One example of a characteristic associated with the input content refers to an authorship property associated with the input content. For example, the property may identify an author of the input content and the system determines whether the author property matches the source from which the input content was received and if there is no match then the system marks the input content as suspicious.

In the example embodiments, however, any malicious or suspicious content included in the input content can be disarmed without having first detected possible or suspected malicious or suspicious content. That is, it is not necessary to first detect any malicious or suspicious content in the input content in order to disarm the malicious content. In some embodiments, one or more malware detection techniques may be implemented together with the exemplary embodiments, but knowledge or awareness of suspected malicious or suspicious content is not required to disarm any malicious content that may be included in the input content. In some embodiments, the disclosed techniques may be performed when one or more malware detection techniques do not identify suspicious content or suspected malicious content in received input content. In some embodiments, received input content that is determined to include malicious content may be quarantined or otherwise blocked from being accessed by a user. Alternatively, in some embodiments, upon identifying suspicious or malicious content, various CDR processes may be performed to disarm the identified malicious content that may be included in the input content. Additionally, in some embodiments, if malicious content is identified, the example embodiments may include functionality for destroying such content that is known to be malicious, in lieu of performing a disarming process. In some embodiments, any received content determined to include malicious content may be quarantined or blocked, so as not to be accessed by the intended recipient altogether. One or more other known content screening or analysis techniques and policies or rules for evaluating the input content may be implemented in addition to those expressly described in the example embodiments.

The performance of particular aspects or operations of process 300 (as well as the other example processes) may be determined based on one or more policies or rules configured for computing system 200. For example, whether or not each step of process 300 is performed may be determined based on one or more policies or rules. The policies or rules may be based on a number of known factors, some of which may be enterprise specific. Thus, the example embodiments for disarming input content are not limited to any particular enterprise computing environment or implementation, and can be implemented as a standalone solution or a suite of solutions, and can be customized according to preferences of a computing environment.

As part of operation 304, computing system 200 may execute a program or instructions or otherwise perform a process to disarm any malicious content that may be included in the input content, thereby creating modified input content. Any one or more CDR techniques, such as those identified above, or other techniques for modifying or transforming input content so as to prevent malicious content from being received by an intended recipient may be implemented. For example, in some embodiments, a modified input file may be created to include modified payload content in place of the original payload by changing the values of the underlying payload data units of the input content, such as according to the techniques of U.S. Pat. No. 9,047,293 and U.S. patent application Ser. Nos. 15/441,860 and 15/441,904, the contents of which are expressly incorporated herein. In some embodiments, the modified input content may include other structural changes to the received input content. For example, a header of a received input content or file may be changed in a modified input content or file. A modified input file may also be encoded or compressed or undergo any number of other changes to a structure, layout, or format of the input content, without preventing materially similar uses and functionality as the received input content. In some embodiments, computing system 200 may modify one or more aspects of the received input content, or all aspects. In some embodiments, computing system 200 may modify the input content according to one or more techniques for generating a visual representation of the input content.

In some embodiments, the particular disarming technique implemented may be based on the type of input content received. Thus, as part of operation 304, computing system 200 may read, scan, or parse the data units of the received input content according to techniques known in the art to determine the type or structure of the received input content. In some embodiments, operation 304 may include additional operations for determining other characteristics of the input content to aid the disarming process for creating modified input content.

In some embodiments, any reading, scanning or parsing process is performed without invoking an execution engine such as application software of the computing system 200 for rendering the input content. For example, in the example embodiments, computing system 200 does not render the input content, as such rendering of input content may result in triggering execution of malicious content. In an example embodiment, input content may include one or more input files or objects etc. In such an embodiment, each distinct file, object, or content of the received input content may be parsed one by one in separate iterative processes to identify any malicious content included in received input content. In other embodiments, aspects of operation 304 may be performed in an isolated or monitored environment, such as a web browsing isolation environment, which may create modified input content by transforming requested web content into a visual representation of the web content that is then passed on to a requesting user. Other transformation or modification techniques may also be implemented to create modified input content.

In some embodiments, as part of operation 304, the modified input content is created as a new file or document or email or a representation of web content, distinct from the received original input content. In some embodiments, the modified input content is configured to be rendered by a user using a rendering application just as (or similar as) the received input content would be rendered by the user. In some embodiments, the modified input content may also be configured to enable full functionality or intended use as the received original input content.

As part of operation 304, additional content features may be inserted into or added to the modified input content such that an intended recipient can distinguish modified input content from other content, such as the original input content. For example, in some embodiments a notification may be added to an electronic communication or other associated content indicated that the original input content has undergone processing to disarm malicious content, or has otherwise been modified. Thus, a notification feature may include elements inserted into a document itself, or alternatively, may be displayed within an electronic communication associated with the modified input content.

As part of operation 306, computing system 200 associates the modified input content with the received original input content. In some embodiments, all or certain types of the received original input content, a copy thereof, or other characteristic (e.g., a hash, URL, any other identifier, etc.) of the original input content may be stored and/or logged in a dedicated repository or protected storage area, such as part of file server 134, content disarm server 136, cloud server 165, or one or more other databases or storage systems. Once created as a result of operation 304, the created modified input content may be stored or indexed together with the original received original input content in the document repository or protected storage area, or otherwise associated with the original input content. The modified input content created for each of the stored and logged original input content may be associated with the original input content according to any number of techniques available in the art. For example, the modified input content or an identifier of the created modified input content may be stored in association with the original input content or otherwise linked with the original input content. Other techniques are contemplated that generally establish an association between an original input content and a modified input content. An example interface illustrating an association between original input content and modified input content according to an example embodiment is shown in and described below with respect to FIG. 4.

In some embodiments, however, such as for a web browsing isolation environment, computing system 200 may not associate any modified input content with the original input content. In such embodiments, identifiers (e.g., URLs, hostnames, domains, etc.) or other characteristics of web content requested or accessed in a web browsing isolation session may still be logged, recorded, or stored. But when modified input content includes only a visual representation of accessed web content (as opposed to discrete communications or files), there may be no need to store the modified web content.

As described above, the dedicated repository may be isolated or otherwise secured or protected to prevent general access to the original input content stored therein and/or to prevent any malicious content that may be included in the original input content to affect other computing elements of a computer system. Thus, in the disclosed embodiments, the original input content may be quarantined such that it does not pose an active threat to a computer system. In some embodiments, however, the original content may be released (selectively or automatically) to certain users or intended recipients according to one or more policies of the computer system. Thus, by storing the original input content, an intended recipient or other user may be able to retrieve such original content at a later time if the original content is determined to be safe or "trusted" according to one or more procedures or policies. Upon request to an administrator, for example, the original input content may be obtained by a requesting user, such as the intended recipient. In some embodiments, a requesting user may be required to answer one or more prompts or pre-defined questions as part of the request or in response to requesting the release of original content. An individual, such as an administrator, or automated system may then determine whether to release the original input content based at least in part on the user's responses, as well as other characteristics of the original input content. Some example prompts may include "were you expecting that file?" or "are you familiar with the sender?" etc. In some embodiments, the pre-defined prompts or questions may be tailored based on one or more characteristics of the original input content.

In some embodiments, computing system 200 may be configured to automatically release original input content or replace modified input content with the original content if or once the original input content is determined to be safe. In some embodiments, once the original content is determined to be safe or "trusted", the original input content may be automatically forwarded to the intended recipient or the intended recipient may otherwise be notified that the original input content is accessible to the intended recipient.

As part of optional operation 308, the modified input content may be provided or forwarded to a recipient computing device such as host computer 120, 122, or a file server 134 or other computing device of computing environment 100. Operation 308 may be performed in those embodiments where process 300 is performed by a computing device or system other than an intended recipient of the input content, for example. In some embodiments, operation 308 may be performed before operation 306. In embodiments where process 300 is performed at a host computer 120, 122, for example, operation 308 may not be performed. Additionally, in some embodiments, modified input content may be forwarded to one or more other computing devices or systems intermediate or alternative to an intended recipient computing device. In the example embodiments, the modified input content may be rendered at the recipient computing device to a human user using known rendering applications for interacting with the input content, or may otherwise be accessed, opened, processed, stored, etc. at the recipient computing device by the user or other process executing at the recipient computing device.

In some embodiments, each input file or each input file of a predetermined type, etc., or all original input content or input content having certain characteristics that is received by a computing system 200 may be processed according to an example process 300, without regard to the characteristics of the input files and input content, such as an identity of a sender or recipient. In some embodiments, one or more malware detection algorithms may first be applied to the received input content and operation 304, etc. is performed only if no suspicious or malicious content is detected. This is advantageous because the disclosed embodiments do not assume that any input content is safe or trusted, based on a preliminary analysis of the input file (if performed) or otherwise. This improves the likelihood of disarming malicious content that may be included in the input content without knowledge by the sender, and for disarming malicious content that may go undetected by conventional malware detection techniques.

Figure 5:
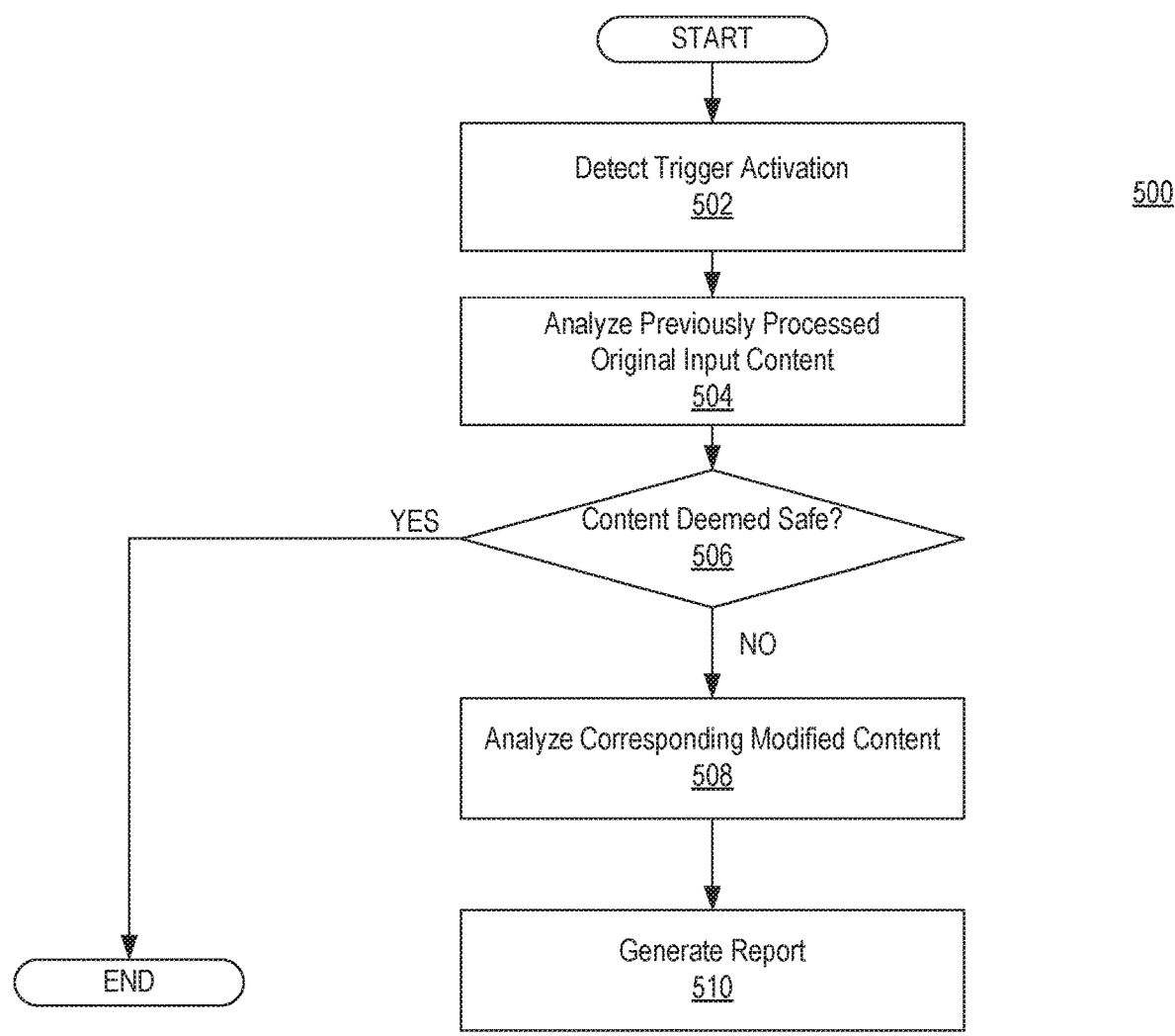
FIG. 5 is a flowchart of an example process for performing retrospective analysis of original input content, consistent with the disclosed embodiments.
Figure 6:
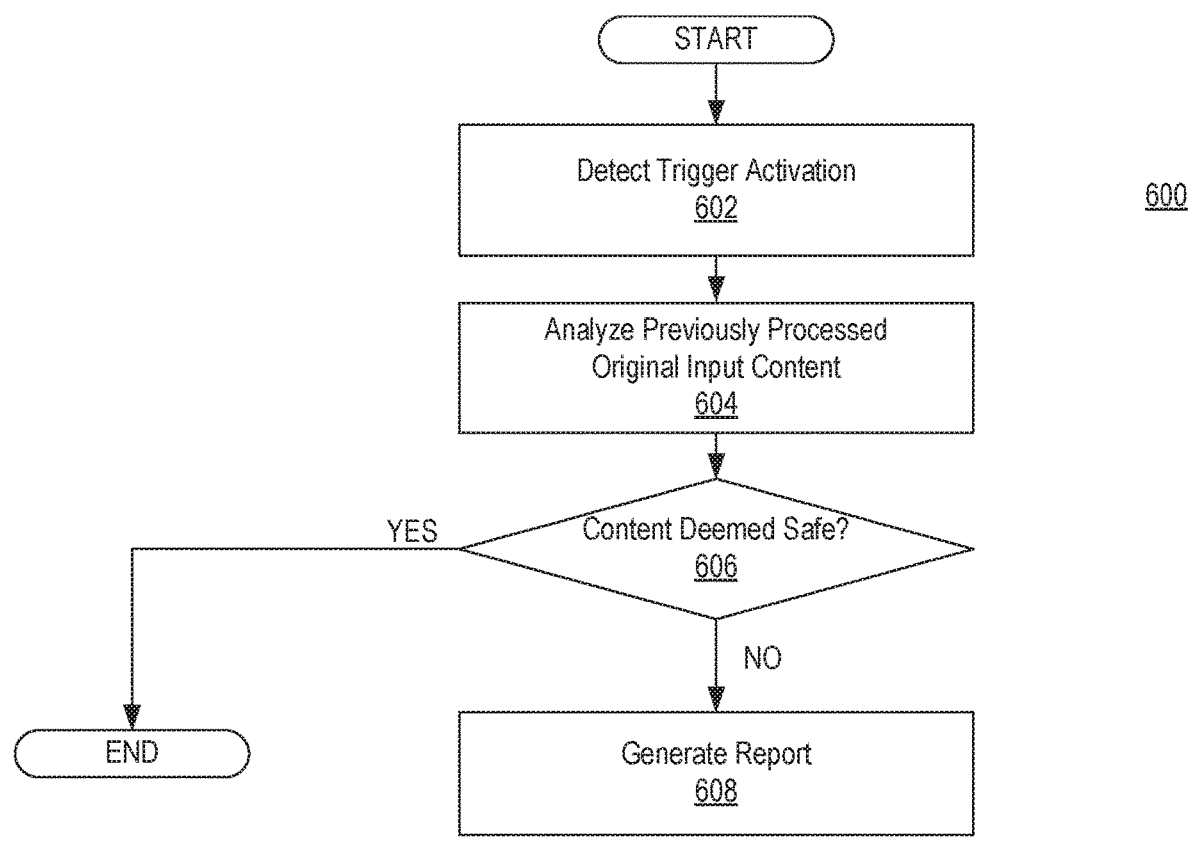
FIG. 6 is a flowchart of an example process for performing retrospective analysis of original input content, consistent with another disclosed embodiment.

Reference is now made to FIGS. 4, 5, and 6 which illustrate aspects of the disclosed embodiments for enabling or performing retrospective analysis of the original input content received by a computing system, subsequent to completion of example process 300 or aspects thereof.

For example, in some embodiments the original input content, a copy thereof, or characteristics associated with the original input content may be analyzed according to one or more malware detection algorithms. In the disclosed embodiments, the malware detection algorithm includes an algorithm that was not available or not implemented previously when the original input content was received (such as in operation 302) or when the modified input content was created (such as in operation 304). In some embodiments the malware detection algorithm for retrospectively analyzing the original input content may include one or more updates to the algorithm that were not part of any malware detection algorithm that may have been implemented when the original input content was received. The one or more updates may include a new malware signature, for example, or a new behavioral characteristic of known malware, an update to a blacklist, or any other technique or change to the algorithm or process for detecting malware or malicious URLs, for example. In some embodiments, the one or more updates may be particular to new malware or new URL or domain associated with malicious activity that has been subsequently identified since the original input content was received.

In the disclosed embodiments, the retrospective analysis may be performed or initiated based on an automatically detected or determined trigger or other manually activated trigger, such as via an input or request received from a system administrator or other requesting application of the computer system, such as via an application programming interface. As described above, the disclosed embodiments may be implemented as part of an enterprise implemented solution for protecting a network 110. An example implementation of the disclosed embodiments may enable a system administrator, for example, to manage or control various aspects of the disclosed embodiments. In some embodiments, an administrator may be provided with an interface providing a visual overview of original input content received by the network 110 and any associated modified input content created according to process 300.

Such an example interface 400 of a computing system for use in the disclosed embodiments is shown in FIG. 4. In some embodiments, example interface 400 is configured to display a plurality of records 402 or data items representative of a plurality of original input content that is received by the computer system, such as in operation 302. The plurality of records may be associated with or represent original input content stored in a dedicated repository or protected storage area, for example. The original input content may also be associated with modified input content that may be provided to an intended recipient in lieu of the original input content, as described above with respect to operations 304, 306, and 308.

As shown in FIG. 4, an example record 402 may include a number of data items pertaining to received input content in the form of an electronic message or email. Example record 402 may be assigned a unique identifier, such as that shown in column 404, and may include a date and time the email is received by the system (406), a user name or email address of a sender of the email (408), an email address of the intended recipient (410), and a comment or subject of the email communication (412). Additionally, in the example embodiment, each received email input content is associated with a modified (e.g., disarmed or sanitized) email content identified by a file name of the modified file (414) and a link to the modified file (415). An example record 402 may also include a link to the original received input content or file (416).

In some embodiments, interface 400 may enable additional functionality to identify a status of the original input content (column 418), and a selectable option (column 420) to enable an administrator, for example, to release original input content as described above. As shown with respect to column 418, in some embodiments interface 400 may be configured to indicate a status identifier, such as an icon, that indicates one or more degrees of trustworthiness of received original content. For example, as shown, one type of icon may present a warning that the content cannot be trusted. Such a warning may be cautionary based on one or more characteristics of the original input content. In some embodiments, a cautionary icon may not necessarily represent that the original input content includes malicious content, but that the original input content is unable to be currently verified as safe or trusted. Another example icon, such as the smiley face icon shown, may indicate that the original input cannot may be trusted. The content may be "trusted" based on the characteristics of the input content or based on one or more analysis performed on the input content. Another example icon may indicate that the original input content has been determined to be unsafe. Such a determination may be based on a retrospective analysis of the original input content, which resulted in a determination that the original input content includes malicious content. In some embodiments, as shown, when the original input content is determined to be unsafe, an administrator may not be able to release the original input content to a requesting user or intended recipient, or may otherwise be warned before doing so.

In some embodiments, interface 400 may also include a link to access any other of various additional details that may be applicable to a particular embodiment. While the interface 400 is shown with respect to received original input content in the form of email, similar interfaces may be adapted for various other types of received input content. Additionally, each of the data elements or other selectable options and features illustrated is by example only. Greater or fewer other data elements may be associated with each received content, and less or additional functionality may be enabled.

As also shown in FIG. 4, example interface 400 may provide one or more selectable options for an administrator to manage aspects of the disclosed embodiments. For example, a first selectable option 422 may enable an administrator to filter the records by report, a second selectable option 424 may enable the administrator to approve selected items to be released to an intended recipient, for example, a third selectable option 426 may enable the administrator to reject selected items, e.g., to remove selected items from the system altogether to preclude any eventual release of the original content to an intended recipient. Another selectable option 428 may enable an administrator to analyze selected items. In some embodiments, the example interface 400 may enable the administrator to analyze selected items, both original content and modified content, to perform various analytical operations on the content for forensic purposes such as to examine malicious content, for example. Based on other analytical operations, a supervisor may be able to determine the extent of modifications included in the modified content and how any malicious content included therein may have been disarmed. Additionally, in some embodiments, an administrator may trigger a retrospective analysis of one or more original content items based on selection of option 428, for example, or other inputs associated with an original content item. Example processes for performing a retrospective analysis of original input content are described below with respect to FIGS. 5 and 6.

Reference is now made to FIG. 5, which is a flowchart of an example process 500 for performing retrospective analysis of original input content. Aspects of process 500 may be performed by a computing system 200, for example.

In some embodiments, retrospective analysis of the original input content may begin upon detecting a trigger or activation of a trigger, e.g., operation 502. In the disclosed embodiments, a trigger may include any automatically identified, detected, or determined event, as well as a manually created or caused event. Examples of automatically identified, detected, or determined events include the occurrence of one or more updates to a malware detection algorithm. The one or more updates may include one or more new signatures of known malicious content being added to a signature database, or new behaviors or characteristics being added to a behavioral characteristics database. In some embodiments, the one or more updates may include the addition of new identifiers to a blacklist, such as an updated list of URLs or other identifiers (e.g., IP address, hostname, domain, etc.) known to be associated with malicious content or malicious activity, or any other updates in malware detection techniques or processes that may be newly implemented and/or designed to detect newly identified forms or types of malicious content or activity. Other examples of automatic triggers include a passage of time, such as to trigger a retrospective analysis every 2 weeks or any other predetermined period, as an example. In some embodiments, a trigger may be particular to certain types of input content, such that e-mails including certain attachments or from certain untrusted domains may be retrospectively analyzed more frequently than other types of input content or input content received from trusted domains.

Other automatic triggers may be based on an analysis of network communications over time, such as upon identifying certain patterns in electronic communications or receipt of communications from untrusted or suspicious domains, etc. In another embodiment, an automatic trigger may be based on storage capacity of the dedicated repository or protected storage area. For example, in some embodiments, the computing system may be configured to dump certain records upon approaching storage capacity. In this scenario retrospective analysis may be performed on various original input content before it is removed from the dedicated repository. Numerous other triggers and combinations of triggers may be implemented or configured according to a policy of an enterprise, for example.

Examples of manually created or caused events may include receipt or detection of a user input, such as via selection of option 428 of interface 400, for example. In some embodiments, a user request for original input content may prompt a retrospective analysis of the original input content. Another example of a manually created or caused event may include a request received via an application programming interface from another process or application of a computing system. In some embodiments, such requests received via an application programming interface may also be automatically communicated (i.e., without any user involvement) and may be indistinguishable from the above-described automatic events. For example, in some embodiments, computing system 200 may receive a request via an application programming interface from one or more malware detection systems or services to perform a retrospective analysis based on one or more updates having been implemented as part of a malware detection algorithm. In some embodiments, computing system 200 may receive, via an application programming interface associated with one or more malware detection systems or services, any indication that a signature list, or blacklist, etc. has been updated, which may trigger a retrospective analysis one or more original input content.

Responsive to detecting an occurrence of or activation of a trigger 502, computing system 200, as part of operation 504, may analyze one or more previously received or processed original input content to determine whether the original input content includes suspected malicious content. As part of operation 504, the computing system may analyze all or only some aspects of the original input content. Additionally, a copy of the originally received input content may be analyzed. In some embodiments the computing system may analyze a characteristic associated with the input content, such as a previously generated hash value, to determine whether the hash value is indicative of a malware signature, for example. In some embodiments, where the original input content is identified based on a URL previously accessed by a computer system, for example, the previously accessed URL may be compared to a blacklist of URLs known to be associated with malicious content, or the content accessible at the URL may be analyzed. As part of operation 504, only certain types of original input content may be analyzed, or only original input content meeting certain other criteria, such as based on an originating domain or date or time of receipt, may be analyzed. In some embodiments, the original input content that is analyzed in operation 504 may be based on the trigger detected in operation 502.

As discussed above, in some embodiments, the original input content is analyzed based on a malware detection algorithm that is different from any malware detection algorithm that may have been implemented when the original input content was received or when modified input content was created. The malware detection algorithm may include one or more updates to any aspect of the malware detection algorithm, such that the updated aspect was not part of any malware detection algorithm previously implemented with respect to the received input content. As similarly described above, the one or more updates may include any update or change to a database of signatures of known malicious content, or a list of URLs (or other identifiers) known to be associated with malicious content, or any update or change to a database of behavioral characteristics of known malicious content, etc. The malware detection algorithm implemented as part of operation 504 may include any one or more techniques for analyzing content, such as signature based techniques or behavioral based techniques or blacklist based techniques, and may implement any number of processes, such as a monitored run environment for analyzing input content and detecting malicious content included therein or malicious activity enabled thereby.

As part of operation 506, it may be determined whether the analyzed original input content can be deemed or assumed to be safe or trusted or otherwise does not contain suspected malicious content that would be detectable by the malware detection algorithm. The determination may be based on the results of operation 504. If the determination deems the original input content "safe" then process 500 may end. In some embodiments, the original input content may then be released to an intended recipient. Also, in some embodiments a report may be generated reflecting that no malicious content was identified. A report may be generated, for example, in those instances in which the trigger detected in operation 502 includes a user input.

If it is determined, as part of operation 506, that the analyzed original input content is not safe (e.g., it includes suspected malicious content), then process 500 may proceed to operation 508 and or 510. In some embodiments, this may indicate that the original input content includes suspected malicious content that was not detectable by a malware detection algorithm used at the time the original input was received. As part of operation 508, the computing system may identify any modified input content that is associated with the original input content (as described with respect to operation 306) and subsequently analyze the corresponding modified input content to determine whether the modified input content includes suspected malicious content, such as the suspected malicious content identified in operation 504. The corresponding modified input content may be analyzed based on the same malware detection algorithm used in operation 504 to determine whether the suspected malicious content was successfully neutralized or disarmed when creating modified input content (as described with respect to operation 304).

Based on the analysis of operation 508, one or more actions may be taken. In some embodiments, as part of operation 510, a report (or other notification) may be generated including the results of process 500. In some embodiments, when the corresponding modified input content is determined not to include the suspected malicious content identified in operation 504, the report may indicate that a malware attack had been successfully prevented by the content disarming or sanitization process 300, for example. In such an embodiment, the report may include a detailed report showing how the malware attack had been prevented. The report may include details concerning one or more portions of the original input content that contained the identified malicious content. The report may also indicate how the identified malicious content was disarmed. For example, in some embodiments, the report may include an indication of one or more modifications to the received original input content that effectively disarmed the malicious content included therein. The one or more modifications may include one or more changes to a digital value of the original input content, or one or more changes to a format or structure of the original input content. The one or more modifications may also include one or more aspects of the original input content that were removed, as well as any other modifications that may have disarmed the included malicious content.

In some embodiments, where the analysis of operation 508 may indicate that the modified input content includes the suspected malicious content identified in operation 504, one or more remedial measures may be implemented based on the identified malicious content to halt or mitigate an attack or otherwise neutralize the attack, according to known techniques. Additionally, in some embodiments, a report may be generated detailing characteristics of the malicious content and any other information that may help indicate how the malicious content evaded any modifications performed in operation 304, for example. In some embodiments, the report may include feedback for one or more content modification techniques that can be used to update the content modification techniques to disarm similar attacks in the future.

Reference is now made to FIG. 6, which is a flowchart of an example process 600 for performing retrospective analysis of original input content. Aspects of process 600 may be performed by a computing system 200, for example.

Process 600 is similar to process 500 in several respects. For example, operations 602, 604, and 606 may be substantially the same as operations 502, 504 and 506, described with respect to process 500 of FIG. 5. Additionally, operation 608 may be substantially similar to operation 510. Thus, the respective disclosures are not repeated here. Process 600 differs from process 500 primarily because it does not analyze any modified input content upon determining that any original input content analyzed in operation 604 includes suspected malicious content. Thus, while processes 500 and 600 may be performed for any type of input content, process 600 may be performed when no corresponding modified input is stored or otherwise associated with the received original input content. In this embodiment, modified input content may still be created in operation 304. Rather, in some embodiments, based on the nature of the input content, for example, it may be unnecessary or undesirable to store such modified input content in association with any details concerning original input content.

For example, process 600 may be suitable for retrospectively analyzing certain web content that may have been requested by one or more computing devices of a network 110. In this embodiments, content disarm server 136 may be configured to implement or control a web browsing isolation environment, such as one that implements a virtual web browsing environment to transform web content into a visual representation that is then provided to a requesting computing device. By presenting only a visual representation of web content, no malicious content that may have been included in the original web content is likely to be passed on to the requesting device. In this embodiment, a list of URL's or other identifiers or characteristics of web content requested via a browser of a network computer, such as a host computer 120, may be logged and recorded by the system, as similarly described with respect to operation 306 and interface 400. However, based on the nature of the transformed web content, it may be either unnecessary or impracticable to store the modified input content (e.g., transformed web content). In this example, as part of operation 604, a previously requested URL (or other identifier) may be compared against a blacklist or database of URLs (or other identifiers) known to be associated with malicious content or activity. Additionally, in some embodiments, content accessible via a previously requested URL, for example, may be analyzed to determine whether the web content includes suspected malicious content. And if based on the analysis of operation 604, it is determined that the previously requested URL is known to be associated with malicious content or that the original web content includes suspected malicious content, then a report may be generated in operation 608 providing details that a malware attack may have been prevented by the web browsing isolation environment.

Process 600 is not limited to analyzing web content, or web browsing isolation environments. Rather, like process 500, process 600 may be implemented for any type of input content and content disarming or sanitization technique.

The foregoing description describes example embodiments for performing a retrospective analysis of original input content in systems that generate modified input content. The above techniques, however, may also be applied for systems that do not generate modified input content. Additionally, any of the several techniques may be combined in any one embodiment depending on the nature of the input content, and one or more network or enterprise rules or policies, for example. The example embodiments therefore may enable a system or user to verify the effectiveness of one or more content modification techniques as well as to determine when potential malware attacks may have been prevented by the implemented systems.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. Thus, while certain features of the example embodiments have been illustrated and described herein, many modifications, substitutions, changes, and equivalents will be apparent to those of ordinary skill in the art. It is, therefore, to be understood that the appended claims are intended to cover all such modifications and changes as fall within the true spirit of the invention.

The claims are to be interpreted broadly based on the language used in the claims and not limited to examples described in the present specification, which are non-exclusive. For example, aspects of the disclosed embodiments are described as operations performed by a computing system, and one skilled in the art will appreciate that these aspects can be configured as a set of instructions stored on and executed from many types of tangible computer-readable media, such as secondary storage devices, like hard disks, floppy disks, or CD-ROM, or other forms of RAM or ROM.

What is claimed is:

1. A method for retrospectively analyzing original input content to detect malicious content in a computer system having a processor, the original input content having been previously processed to create modified input content and prevented from being received by an intended recipient, the method comprising:
   accessing, by the processor, the original input content;
   determining, by the processor, based on a malware detection algorithm whether the original input content includes suspected malicious content, wherein the malware detection algorithm includes at least one update of a signature or behavioral characteristic that was not included in the malware detection algorithm when the modified input content was created; and
   when it is determined that the original input content includes suspected malicious content, determining, by the processor, whether the modified input content includes the suspected malicious content.

2. The method of claim 1, wherein the malware detection algorithm includes analyzing the original input content based on a set of signatures of a database of known malicious content, wherein the set of signatures includes at least one signature not included in the database when the modified input was created.

3. The method of claim 1, wherein the malware detection algorithm includes analyzing the original input content based on a set of behavioral characteristics of known malicious content included in a database, wherein the set of behavioral characteristics includes at least one behavior characteristic not included in the database when the modified input content was created.

4. The method of claim 3, wherein analyzing the original input content based on a set of behavioral characteristics is performed in a monitored run environment.

5. The method of claim 1, wherein the analyzing the original input content is performed responsive to a trigger.

6. The method of claim 5, wherein the trigger includes an update in the malware detection algorithm.

7. The method of claim 5, wherein the trigger includes at least one signature being added to a database of known malicious content.

8. The method of claim 5, wherein the trigger includes at least one behavioral characteristic being added to a database of behavioral characteristics of known malicious content.

9. The method of claim 1, further comprising generating a notification when it is determined that the original input content includes suspected malicious content.

10. The method of claim 1, further comprising generating a notification when it is determined that the modified input content does not include the suspected malicious content.

11. The method of claim 10, wherein the notification includes a report indicating at least one change in a digital value of the modified input content that caused the determined suspected malicious content to be disarmed.

12. The method of claim 1, wherein the original input content is stored in a storage area of the computer system configured to prevent infection of the computer system by any malicious content included in the original input content.

13. The method of claim 1, wherein the original input content includes a copy or a portion of original input content received by the computer system.

14. The method of claim 13, wherein the characteristic associated with the original input content includes a hash value of the original input content.

15. The method of claim 1, wherein the accessing is performed responsive to receiving a selection of the original input content via an interface.

16. The method of claim 15, wherein the interface is configured to:
display a plurality of original input content having been previously processed to generate a plurality of modified input content; and
receive the selection via a user input on the interface.

17. The method of claim 15, wherein the selection of the original input content is received via an application programming interface.

18. The method of claim 1, wherein the original input content includes at least one of a file received by the computer system or a subset of content of the file received by the computer system.

19. A system for retrospectively analyzing original input content to detect malicious content, the original input content having been previously processed to generate modified input content and prevented from being received by an intended recipient, the system comprising:
means for accessing the original input content or a characteristic associated with the original input content;
means for analyzing the original input content or the characteristic associated with the original input content based on a malware detection algorithm to determine whether the original input content includes or is associated with suspected malicious content, wherein the malware detection algorithm includes at least one update of a blacklist item, signature, or behavioral characteristic that was not included in the malware detection algorithm when the modified input content was generated; and
means for generating a report indicating that suspected malicious content was modified in the previously processed original input content based on the determination that the original input content includes or is associated with suspected malicious content.

20. The system of claim 19, wherein the original input content includes web content, and further wherein the modified input content includes a transformed visual representation of the web content.

21. The system of claim 19, wherein the characteristic associated with the original input content includes a URL.

22. The system of claim 21, wherein the malware detection algorithm includes a comparison of the URL with a blacklist of URLs associated with malicious content.

23. A computer system for retrospectively analyzing original input content to detect malicious content, the original input content having been previously processed to create modified input content and prevented from being received by an intended recipient, the computer system comprising:
a memory device storing instructions, wherein the instructions include a malware detection algorithm; and
a processor configured to execute the instructions to:
access the original input content;
determine based on the malware detection algorithm whether the original input content includes suspected malicious content, wherein the malware detection algorithm includes at least one update of a signature or behavioral characteristic that was not included in the malware detection algorithm when the modified input content was created; and
when the original input content is determined to include suspected malicious content, determine whether the modified input content includes suspected malicious content.

24. The computer system of claim 23, wherein the processor is further configured to execute the malware detection algorithm to analyze the original input content based on a set of signatures included in a database of known malicious content, wherein the set of signatures includes at least one signature not included in the database when the modified input was created.

25. The computer system of claim 23, wherein the processor is further configured to execute the malware detection algorithm to analyze the original input content based on a set of behavioral characteristics included in a database of known malicious content, wherein the set of behavioral characteristics includes at least one behavior characteristic not included in the database when the modified input was created.

26. The computer system of claim 25, wherein the processor is further configured to execute the malware detection algorithm to analyze the original input content based on a set of behavioral characteristics is performed in a monitored run environment.

27. The computer system of claim 23, wherein the processor is further configured to execute the malware detection algorithm to analyze the original input content in response to a trigger.

28. The computer system of claim 27, wherein the trigger includes an update in the malware detection algorithm.

29. The computer system of claim 27, wherein the trigger includes at least one signature being added to a database of known malicious content.

30. The computer system of claim 27, wherein the trigger includes at least one behavioral characteristic being added to a database of known malicious content.

31. The computer system of claim 23, wherein the processor is further configured to execute the instructions to generate a notification when the original input content is determined to include suspected malicious content.

32. The computer system of claim 23, wherein the processor is further configured to execute the instructions to generate a notification when the modified input content is determined to include no suspected malicious content.

33. The computer system of claim 32, wherein the notification includes a report indicating at least one change in a digital value of the modified input content that caused the determined suspected malicious content to be disarmed.

34. The computer system of claim 23, further comprising a storage area configured to store the original input content to prevent infection of the computer system by any malicious content included in the original input content.

35. The computer system of claim 23, wherein the original input content includes a copy or a portion of original input content received by the computer system.

36. The computer system of claim 35, wherein the characteristics associated with the original input content includes a hash value of the original input content.

37. The computer system of claim 23, further comprising an interface, and wherein the processor is further configured to execute the instructions to access the original input in response to receiving a selection of the original input content via the interface.

38. The computer system of claim 37, wherein the interface is configured to display a plurality of original input content having been previously processed to generate a plurality of modified input content and to receive the selection via a user input on the interface.

39. The computer system of claim 37, wherein the processor is further configured to execute the instructions to receive the selection of the original input content via an application programming interface.

40. The computer system of claim 23, wherein the original input content includes at least one of a file received by the computer system or a subset of content of the file received by the computer system.

* * * * *

UNITED STATES PATENT AND TRADEMARK OFFICE
CERTIFICATE OF CORRECTION

PATENT NO. : 10,664,602 B2
APPLICATION NO. : 15/926862
DATED : May 26, 2020
INVENTOR(S) : Aviv Grafi Page 1 of 1

It is certified that error appears in the above-identified patent and that said Letters Patent is hereby corrected as shown below:

In the Claims

In Claim 36, Column 26, Lines 1-2, "characteristics" should read --characteristic--.

Signed and Sealed this
Fourteenth Day of July, 2020

Andrei Iancu
*Director of the United States Patent and Trademark Office*